United States Patent
Kroll et al.

(10) Patent No.: US 11,320,085 B2
(45) Date of Patent: May 3, 2022

(54) SYSTEM AND PROTECTOR FOR PROTECTING AN END OF A PIPE

(71) Applicants: Peter Kroll, Hockley, TX (US); Timm Jörgen Kroll, Hamm (DE); Jan-Pit Kroll, Hamm (DE)

(72) Inventors: Peter Kroll, Hockley, TX (US); Timm Jörgen Kroll, Hamm (DE); Jan-Pit Kroll, Hamm (DE)

( * ) Notice: Subject to any disclaimer, the term of this patent is extended or adjusted under 35 U.S.C. 154(b) by 0 days.

(21) Appl. No.: 17/049,626

(22) PCT Filed: Feb. 11, 2019

(86) PCT No.: PCT/EP2019/053296
§ 371 (c)(1),
(2) Date: Oct. 22, 2020

(87) PCT Pub. No.: WO2019/206484
PCT Pub. Date: Oct. 31, 2019

(65) Prior Publication Data
US 2021/0239254 A1   Aug. 5, 2021

Related U.S. Application Data

(60) Provisional application No. 62/662,525, filed on Apr. 25, 2018.

(51) Int. Cl.
*F16L 57/00* (2006.01)
*E21B 17/00* (2006.01)
*B65D 59/06* (2006.01)

(52) U.S. Cl.
CPC .......... *F16L 57/005* (2013.01); *E21B 17/006* (2013.01); *B65D 59/06* (2013.01)

(58) Field of Classification Search
CPC ........ F16L 57/005; B65D 59/06; B65D 59/00
USPC ....................... 138/96 R, 96 T; 248/56, 68.1
See application file for complete search history.

(56) References Cited

U.S. PATENT DOCUMENTS

| | | | |
|---|---|---|---|
| 3,485,271 A | | 12/1969 | Halsey |
| 4,099,617 A | * | 7/1978 | Nist, Jr. ................. B65D 61/00 100/2 |
| 4,099,626 A | * | 7/1978 | Magnussen, Jr. ...... A47B 63/02 211/194 |
| 4,487,228 A | * | 12/1984 | Waldo .................... B65D 59/02 138/89 |
| 4,796,668 A | * | 1/1989 | Depret ................... B65D 59/00 138/96 R |

(Continued)

FOREIGN PATENT DOCUMENTS

| | | |
|---|---|---|
| GB | 845128 A | 8/1960 |
| WO | WO 99/61836 | 12/1999 |

OTHER PUBLICATIONS

International Preliminary Report on Patentability for International Application No. PCT/EP2019/053296, dated Nov. 20, 2020.

(Continued)

*Primary Examiner* — Patrick F Brinson
(74) *Attorney, Agent, or Firm* — Jason H. Vick; Sheridan Ross, PC

(57) ABSTRACT

A system and a protector for protecting pipes is proposed, wherein the protector comprises a bumper portion made out of an elastomer and an engaging portion made out of a polymeric material.

20 Claims, 14 Drawing Sheets

(56) References Cited

U.S. PATENT DOCUMENTS

| | | | | |
|---|---|---|---|---|
| 5,570,723 | A * | 11/1996 | Hwang | F16L 7/00 |
| | | | | 138/106 |
| 2004/0201131 | A1* | 10/2004 | Goodson | F16L 57/005 |
| | | | | 264/220 |
| 2007/0113910 | A1* | 5/2007 | Pagura | F16L 57/005 |
| | | | | 138/96 T |
| 2009/0050230 | A1* | 2/2009 | Heritier | E21B 17/006 |
| | | | | 138/96 R |
| 2013/0105028 | A1 | 5/2013 | Lockard et al. | |
| 2014/0053908 | A1* | 2/2014 | Smillie | B32B 15/082 |
| | | | | 137/1 |

OTHER PUBLICATIONS

International Search Report for International Application No. PCT/EP2019/053296, dated May 27, 2019.
Written Opinion for International Application No. PCT/EP2019/053296, dated May 27, 2019.

* cited by examiner

SYSTEM AND PROTECTOR FOR PROTECTING AN END OF A PIPE

CROSS-REFERENCE TO RELATED APPLICATIONS

This application is a national stage application under 35 U.S.C. 371 of PCT Application No. PCT/EP2019/053296 having an international filing date of 11 Feb. 2019, which designated the United States, which PCT application claimed the benefit of U.S. Patent Application No. 62/662,525, filed 25 Apr. 2018, each of which are incorporated herein by reference in their entirety.

FIELD

The present invention relates to a protector for protecting an end of a pipe (pipe end protector) and a system comprising a pipe and a protector.

The present invention in particular relates to thread protectors and/or thread protector assemblies and, more particularly, thread protectors and/or assemblies for oilfield tubulars such as surface casing, casing, tubing, and other threaded connections.

BACKGROUND

Pipe end protectors for industrial pipes are preferably used during handling, transport and storage of pipes. In particular, pipe end protectors are adapted to protect pipes, in particular the pipe ends, from damages which might occur during handling, transport and/or storage of the pipes.

Various devices are well known for protecting pipes, in particular the threads on pipes.

As used herein, the terms "pipe" or "pipes" shall be construed broadly to encompass any in particular metallic tubular members including, but not limited to, oilfield tubulars, pipes, tubes, connectors, conduits, fittings, and the like.

In the context of the present invention, the term "pipe" preferably refers to a preferably elongated device for the transportation of an in particular liquid and/or gaseous medium, such as oil or gas, and/or for the fluidic connection between two sites.

Preferably, a pipe is a hollow cylinder and/or comprises a circular cross-section.

Industrial pipes, preferably for the use in oilfield applications, are typically produced in sections, each having a length of more than one meter, e.g. 1.8 to 12.2 m. The pipes are connectable to one another and/or to other devices using various designs and methods at the (finished) ends of the sections.

Preferably, pipes, in particular oilfield tubulars having a length of pipe, comprise a box end (box), also referred to as the female portion/end, having internal threads and/or a pin end (pin), also referred to as the male portion/end, having external threads.

However, also non-threaded or "plain" pipes might be used and/or connected to one another, e.g. by means of a slip-joint connection and/or welding.

Obviously, each of these preferably threaded ends requires a different (thread) protector. For example, (thread) protectors for the box of a pipe, hereinafter also referred to as box protectors, preferably comprise a tubular (body) portion which can have a frustoconical outer surface which is externally threaded to form a tapered threaded portion, in case the box threads are tapered, or a cylindrical outer surface with straight threads in the event the box threads are straight.

Box (thread) protectors also might have a radially outwardly extending annular flange attached to one end of the body portion and which preferably has an outside diameter which is equal to or greater than the outside diameter of the pipe such that when the (thread) protector is inserted or screwed into the box of the pipe, the flange engages the end of the pipe on which the box is formed, and can also extend radially outwardly beyond the outside diameter of the pipe.

In the case of (thread) protectors for the pin of a pipe, hereinafter also referred to as pin (thread) protectors, again there is a tubular (body) portion which is optionally internally threaded with threads to match the threads on the pin, e.g. they can be straight or tapered, depending upon the threads of the pin.

Pin end (thread) protectors also preferably include an annular flange connected to the body which overlies the end of the pipe wherein the outside diameter of the flange is larger than the outside diameter of the pipe.

In the drilling of an oil/gas well, initially large diameter pipe known as surface casing is preferably placed in the borehole. The surface casing can range in diameter from 0.47 to 1.22 m outside diameter.

Generally speaking, and in the case of offshore platforms, this large diameter surface casing preferably lies horizontally on a barge or the like adjacent the platform. To lift it off the barge onto the rig floor of the platform, the surface casing is preferably either grasped in the middle or on opposing ends, depending on the type of pipe handling equipment on the rig, and then preferably raised by the pipe handling apparatus to the floor of the platform.

While it is being raised from the barge to the platform, the surface casing is preferably horizontally oriented. Accordingly, it can rotate to some extent about an axis transverse to the pipe meaning that the ends of the pipe can strike structural portions of the platform, which can damage the ends/threads, or in more severe cases, bend the end(s) of the pipe out of its generally circular cross-sectional form.

In addition to the large diameter pipe discussed above, (thread) protectors are used on virtually all tubulars used in the drilling, completion, and production of oil and gas wells.

Conventional protectors are made out of plastic or metal.

The known plastic protectors are very expensive and have an insufficient resistance to impacts due to the high pipe body weight.

The known metal protectors are subjected to electrolytic corrosion due to dissimilarities between the metal of the protector and the pipe body.

Consequently, there is a need for improved pipe end protectors.

SUMMARY

Therefore, the task of the present invention is to avoid or at least to reduce the aforementioned disadvantages and/or to provide an improved protector for an end of a pipe, preferably wherein a simple, cost-effective, light, robust and/or shock resistant construction is possible or facilitated.

The aforementioned task is solved by a protector or a system as disclosed herein.

According to one aspect of the present invention, the protector comprises an engaging portion and a bumper portion, preferably wherein the engaging portion and the bumper portion are in particular directly and/or radially connected to one another, preferably by glueing, welding and/or screwing.

The engaging portion is preferably at least partially, mostly preferred completely, made out of a polymeric material, preferably plastic material, in particular (pure) polypropylene and/or (pure) polyethylene.

The bumper portion is preferably softer, i.e. less hard, than the engaging portion or vice versa and/or has a shore D hardness that is lower than the shore D hardness of the engaging portion or vice versa.

According to the present invention, "hardness" is a material property and preferably refers to the resistance of a material, in particular the engaging portion and/or the bumper portion, to (localized) plastic deformation used by either mechanical indentation or abrasion.

The hardness may depend on ductility, elastic stiffness, plasticity, strain, strength, toughness, viscoelasticity and viscosity.

The hardness of a material is preferably be measured by three main types of hardness measurements: scratch hardness, indentation hardness and rebound hardness. Common indentation hardness scales are Rockwell, Vickers, Shore and Brinell, among others.

In the context of the present invention, the hardness is preferably determined by means of an indentation hardness test and/or a durometer and/or according to DIN EN ISO 868:2003-10 and/or DIN ISO 7619-1:2012-02.

To determine the hardness of a material, the depth of an indentation in the material created by a predefined force is preferably measured. Mostly preferred, the shore scale is used, in particular the shore D scale.

As already mentioned, the protector is designed to protect the pipe end in particular during storage, transportation or handling.

Preferably, the engaging portion is adapted to—directly and/or radially—interact with the pipe and/or connect the protector to the pipe. In particular, the protector is attached to the pipe by means of the engaging portion.

The engaging portion preferably has a sufficient hardness to engage the pipe and/or to connect/disconnect the protector to/from the pipe, in particular by means of screwing/unscrewing. Further, due to the hardness of the engaging portion, the protector resists axial pull-off or stripping during handling practices.

The bumper portion is preferably adapted to protect the pipe, in particular its end, and/or the engaging portion, mostly preferred against mechanical impacts.

In particular, the bumper portion serves as a damper and/or shock absorber. Mostly preferred, the bumper portion at least partially absorbs vibrations and/or (mechanical) impacts on the protector, in particular its engaging portion, and the pipe.

Optionally, the bumper portion might be equipped with air pockets and/or is spongelike, in particular in order to provide the sufficient softness.

Thus, due to the combination of the engaging portion and the bumper portion and/or the different hardness of the protector, it is possible to rigidly and/or detachably connect the protector to the pipe and, further, to effectively protect the pipe against impacts.

According to a further aspect of the present invention, which can be realized independently, the bumper portion and/or the engaging portion is at least partially, mostly preferred completely, made out of an elastomer, in particular a thermoplastic elastomer (TPE).

Mostly preferred, the material of the bumper portion differs from the material of the engaging portion.

In particular, the engaging portion is at least partially, preferably completely, made out of thermoplastic, e.g. (pure) polypropylene and/or (pure) polyethylene, and the bumper portion is at least partially, preferably completely, made out of an in particular thermoplastic elastomer.

Alternatively, the bumper portion is at least partially, preferably completely, made out of thermoplastic, e.g. (pure) polypropylene and/or (pure) polyethylene, and the engaging portion is at least partially, preferably completely, made out of an in particular thermoplastic elastomer.

In this way, corresponding advantages can be reached.

Thermoplastics, in particular polypropylene as well as polyethylene, are plastics which can provide the needed hardness and/or strength of the engaging portion, whereas elastomers are plastics which can provide the needed softness, elasticity and/or ductility of the bumper portion.

However, according to a further aspect of the present invention, that can be realized independently, both, the engaging portion and the bumper portion comprise and/or are at least partially made out of an elastomer, in particular a thermoplastic elastomer, or a thermoplastic, preferably wherein the bumper portion is softer than the engaging portion and/or has a shore D hardness that is lower than the shore D hardness of the engaging portion.

To tailor the properties of the bumper portion, its material might include additives and/or fillers, wherein the additives and/or fillers may be any material suitable for absorbing the impact force transmitted to the engaging portion and/or the pipe ends and/or for decreasing the hardness of the bumper portion.

To tailor the properties of the engaging portion, its material may include additives and/or fillers, wherein the additives and/or fillers may be any material suitable for increasing the hardness and/or strength of the engaging portion.

Preferably, the engaging portion, in particular its material, is—in particular not only harder but also—more brittle and/or stiffer than the bumper portion, in particular its material.

Preferably, the bumper portion is—in particular not only softer but also—tougher and/or more ductile and/or more elastic than the engaging portion.

In the context of the present invention, "brittleness" is a material property and preferably refers to the tendency of a material to fracture with very little or no detectable plastic deformation beforehand. The opposite of brittleness is ductility.

In the context of the present invention, "stiffness" preferably defines the extent to which an object—or here the engaging portion—resists deformation in response to an applied force.

In the context of the present invention, "toughness" is a material property and/or preferably the ability of a material to absorb energy and/or plastically deform without fracturing. Preferably, "toughness" is defined as the material's resistance to fracture when stressed.

In the context of the present invention, "elasticity" is a material property and/or preferably the ability of a material to elastically deform in response to an applied force and/or to return to its original size/shape/form when the applied force is removed.

In order be tough, the material is preferably both, strong and ductile.

The toughness can be determined by integrating the stress-strain curve and is the energy of mechanical deformation per unit volume prior to fracture.

The toughness of a material is preferably determined by performing an impact test, e.g. Charpy impact test or Izod impact test, mostly preferred according to DIN EN ISO 179-1:2010-11.

Preferably, brittle materials that are strong but have a limited ductility are mostly not tough.

The toughness and/or the brittleness of a material preferably varies with a temperature variation. In particular, the toughness decreases and/or the brittleness of a material increases with a decreasing temperature.

Preferably, the toughness and/or ductility of the bumper portion is higher than the toughness and/or ductility of the engaging portion even at low temperatures, preferably below 273.15 K, in particular below 253.15 K or 223.15 K.

In this way, the risk of a (brittle) fracture and/or of a failure of the protector at low temperatures is reduced.

Due to the bumper portion, in particular its toughness and/or ductility, it is possible to use the protector in extreme weather conditions, in particular in very cold regions, and/or at a temperature below 273.15 K, preferably below 253.15 K or 223.15 K.

The bumper portion preferably serves as a splinter/burst protection or a splinter/burst guard and/or ensures or increases the operational capability and/or the usability of the protector, in particular of the engaging portion, mostly preferred at the aforementioned temperature.

Even if the engaging portion ruptures and/or has several cracks, the bumper portion preferably provides the dimensional/structural/form stability of the protector.

Mostly preferred, the engaging portion is held together by the bumper portion, even in case the engaging portion comprises one or several ruptures.

As already mentioned, the protector can be embodied as a pin protector or a box protector.

A protector that is embodied as a pin protector might be at least partially attached/plugged on the pipe, in particular its end that is embodied as a pin end. A protector that is embodied as a box protector might be at least partially inserted/plugged in the pipe, in particular its end that is embodied as a box end.

The bumper portion preferably covers the engaging portion and/or an axial end thereof on a side facing away from the pipe, to the outside and/or radially.

In case of a pin protector, the bumper portion preferably surrounds the engaging portion radially and/or covers the engaging portion to the outside. With other words, the engaging portion is preferably—at least partially—arranged within the bumper portion and/or the inner diameter of bumper portion is preferably larger than the outer diameter of the engaging portion.

In case of a box protector, the engaging portion preferably surrounds the bumper portion radially and/or the bumper portion covers the engaging portion to the inside. With other words, bumper portion is preferably—at least partially—arranged within the engaging portion and/or the outer diameter of bumper portion is preferably smaller than the inner diameter of the engaging portion.

According to a preferred embodiment of the invention, the protector is embodied as a thread protector and/or adapted to protect a threaded end of a pipe. Therefore, the engaging portion may comprise a thread for the threaded pipe. The thread of the protector can be an external thread or an internal thread depending on the thread of the pipe.

The proposed system comprises at least one pipe and at least one protector, wherein the protector is (directly) attached to the pipe, in particular its axial end. In this way, corresponding advantages can be achieved.

Preferably, the coefficient of thermal expansion of the engaging portion corresponds to and/or matches the coefficient of thermal expansion of the pipe, in particular such that the protector does not disengage from the threads due to temperature variations and/or such that thermal stresses are reduced.

In the context of the present invention, the coefficient of thermal expansion is a material property and/or a value of a material indicating its tendency to change in shape, area and/or volume in response to a temperature change, preferably wherein the coefficient of thermal expansion is a substance-specific value in the unit $K^{-1}$. A high coefficient of thermal expansion indicates a high change in shape, area and/or volume in response to a change in temperature and a low coefficient of thermal expansion indicates a low change in shape, area and/or volume in response to a change in temperature.

According to a preferred embodiment of the system, the system comprises a plurality of pipes and at least one support in order to space the pipes apart from one another and/or to hold the pipe spaced apart from one another. In this way, a collision of pipes, e.g. during transportation, can be avoided.

The above mentioned aspects and features of the present invention and the aspects and features of the present invention that will become apparent from the claims and the following description can, in principle, be implemented independently from one another but also in any combination or order.

Other aspects, advantages, features and properties of the present invention will become apparent from the claims and the following description of the preferred embodiments with reference to the accompanying drawings.

DETAILED DESCRIPTION

In the Figures, the same reference signs are used for the same of similar parts and components, resulting in corresponding or comparable properties, features and advantages, even if these are not separately described.

Figure 1:
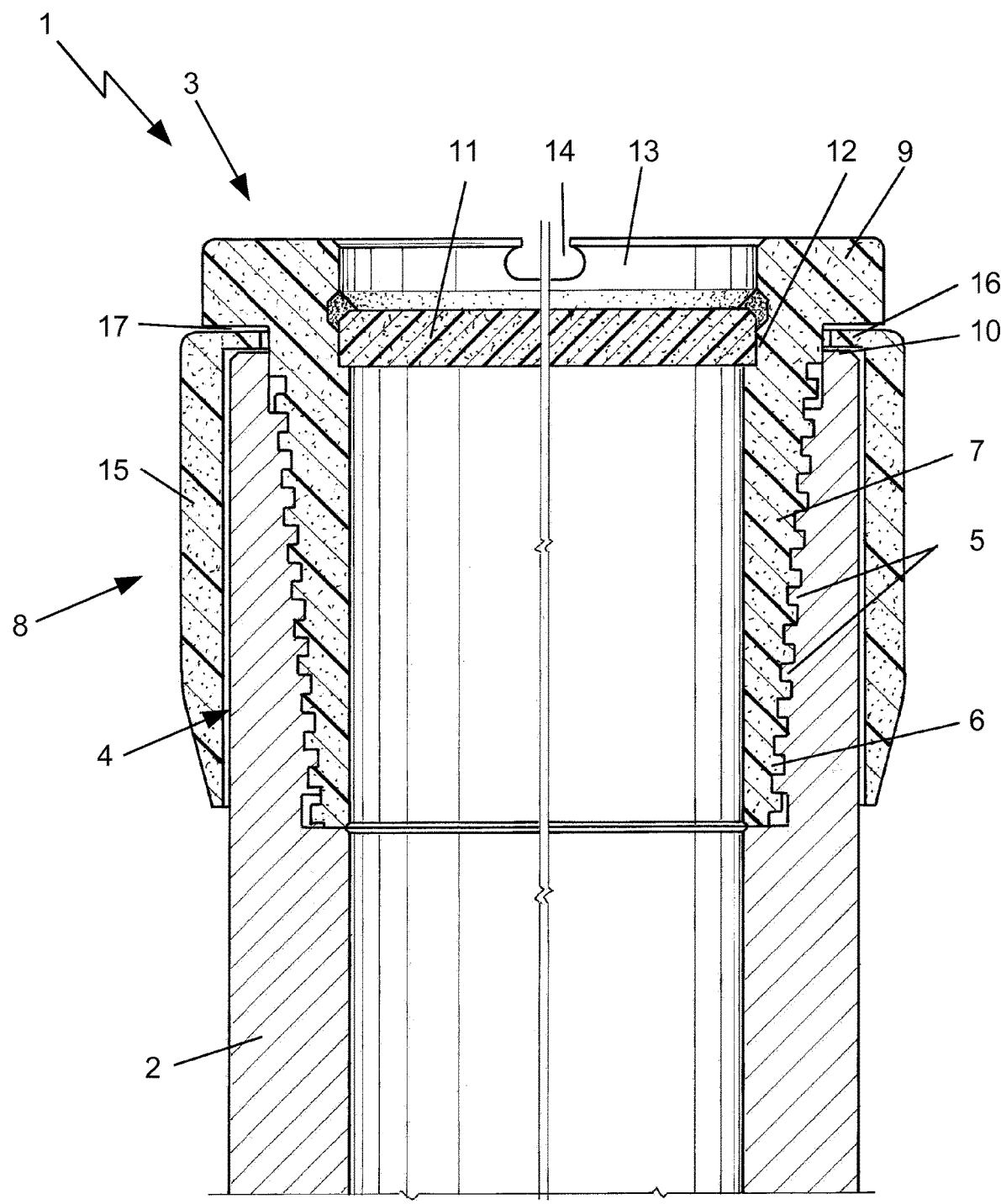
FIG. 1 is a schematic section of a proposed system having a partially shown pipe and a proposed protector connected thereto.

FIG. 1 is a schematic section of a proposed system 1 comprising a pipe 2 and a proposed protector 3 for protecting the pipe 2, in particular an axial end 4 thereof.

The protector 3 is preferably adapted to protect the pipe 2, in particular its end 4, against damages, e.g. that might occur during transportation, as already mentioned.

The protector 3 is preferably embodied as a cover, cap and/or insert, in particular depending on the pipe 2 to be protected, as will be explained in the following.

Figure 2:
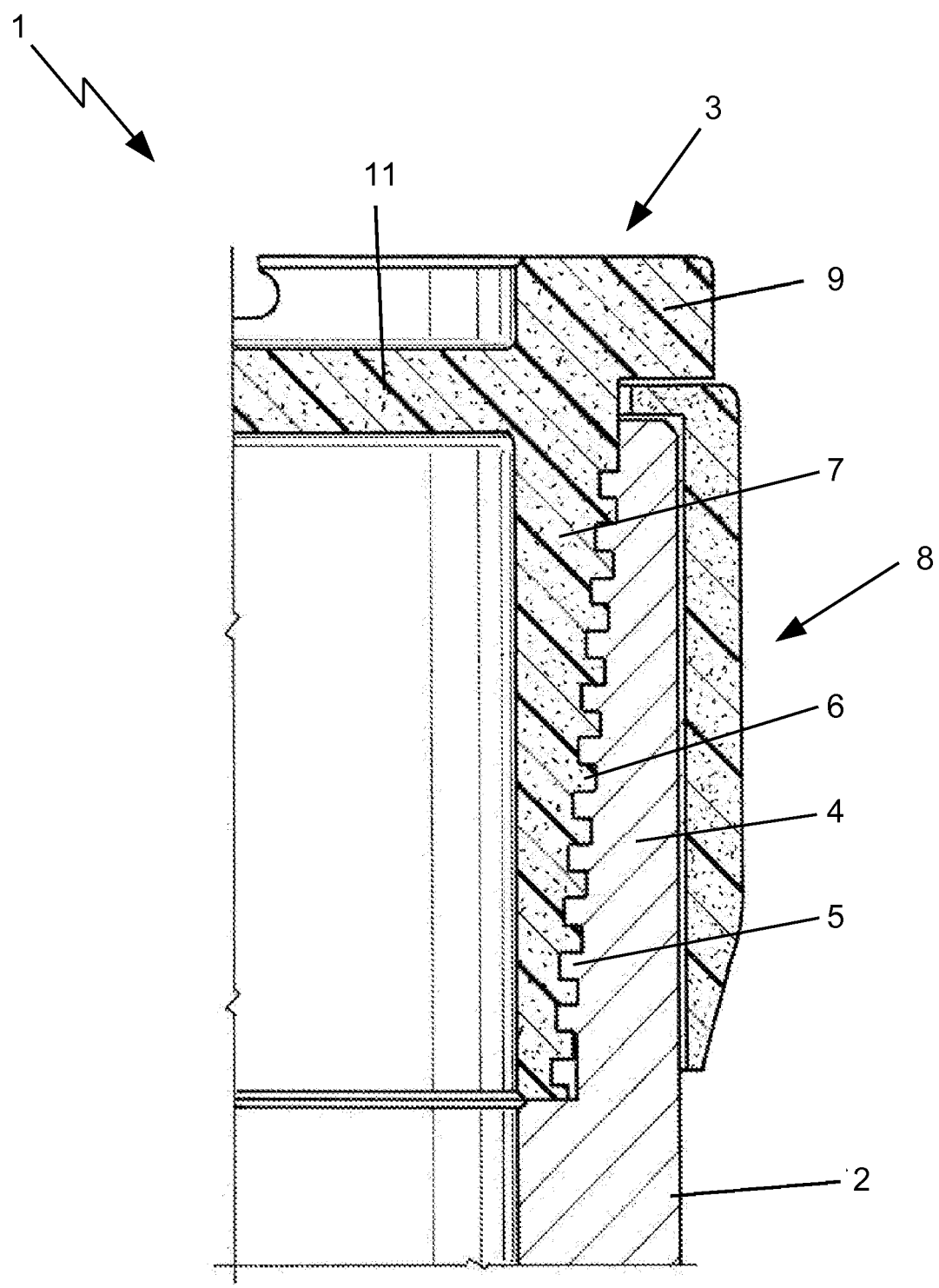
FIG. 2 is a schematic section of the system according to FIG. 1, but having a modified protector.

In the embodiment shown in FIGS. 1 and 2, the protector 3 is embodied as an insert and/or adapted to be at least partially inserted/placed into the pipe 2, in particular its end 4. In particular, the protector 3 is adapted to protect the interior and/or the inner side of the pipe 2, in particular its end 4. Thus, FIG. 1 shows a box protector 3.

Alternatively or additionally, the protector 3 is at least partially plugged/pushed/placed on the pipe 2, in particular its end 4. In particular, the protector 3 can also be adapted to protect the exterior and/or the outer side of the pipe 2, in particular its end 4.

In the embodiment shown in FIG. 1, the protector 3 is preferably adapted to cover the pipe 2, in particular its end 4, to the outside and to the inside and/or to protect the interior and the exterior of the pipe 2, in particular its end 4, as will be explained in the following in detail.

The pipe 2, in particular its end 4, might be equipped with a thread 5.

Optionally, the protector 3 is embodied as a thread protector and/or comprises a thread 6, preferably wherein the thread 6 of the protector 3 corresponds to and/or matches the thread 5 of the pipe 2.

Mostly preferred, the protector 3 is embodied to protect the pipe thread 5 against damages, in particular during transportation, as already mentioned.

In the embodiment shown in FIG. 1, the pipe 2 comprises an internal thread 5 and the protector 3 comprises an external thread 6.

Preferably, the pipe 2, in particular its end 4, is embodied as a box and/or adapted to receive another pipe (not shown). Correspondingly, the protector 3 is embodied as a box protector and/or adapted to protect the internal thread 5 of the pipe 2.

The (thread) protectors 3 of the present invention, be they for pin connections or box connections, preferably have a (first) portion 7 which is preferably threaded to correspond to the threads 5 of the pin or box, respectively (thread engaging portion).

Preferably, the (thread) protectors 3 have a shore D hardness of from about 60-70.

Preferably, the (thread) protector 3 comprises a bumper portion 8, in particular at the axial end of the protector 3.

The bumper portion 8 (bumper) preferably does not engage the threads 5 of the pin or box, respectively, and/or is softer (than the thread engaging portion 7), preferably having a shore D hardness of less than about 50, preferably about 40-50.

The (thread) engaging portion 7 is in particular characterized by having a coefficient of thermal expansion (COE) which is sufficiently similar to the COE of the metal forming the threads 5, in particular such that the (thread) protectors 3 do not become disengaged from the threads 5 when the threaded connections are subjected to wide temperature swings.

The (thread) engaging portion 7 can be formulated from a wide variety of polymeric materials, such as polyethylene, polypropylene, ethylene-propylene copolymer, nylon, etc. Particularly preferred is polypropylene.

In addition to the polymeric material, the (thread) protectors 3 can include additives and fillers to tailor their properties, as already mentioned. The fillers used, particularly in the (thread) engaging portion 7, can include a wide variety of materials, such as calcium carbonate, talc, silica, wollastonite, clay, calcium sulfate fibers, mics, glass beads, alumina trihydrate, carbon fiber, fibers of thermosetting resins, etc.

As is well known to those skilled in the art, the size and shape of the filler preferably has a marked influence on the mechanical properties imparted to the thermoplastic resins, e.g. polypropylene, forming the (thread) protectors 7. For example, it is well known that fibers of prismatic particles usually increase both tensile and flex strength in all three orthogonal dimensions. Flakes or plate-like fillers generally reinforce strength in two dimensions, since they usually become oriented in the direction of the resin flow during molding.

However, all filler shapes can increase the resulting plastic's modulus and contribute to the plastics' dimensional and thermal stability. It is in particular well known that high aspect-ratio fillers, those with fiber or plate-like shapes, help maintain or increase tensile strength compared to plastics without fillers.

As a general proposition, all fillers can increase the thermal conductivity and reduce the COE significantly. Thus, depending upon the temperature expected to be encountered by the tubular members/pipe 2 to which the (thread) protectors 3 are attached, the skilled artisan can readily formulate the (thread) engaging portion 7 from a composition comprised for example of polypropylene and suitable fillers to accommodate the expected expansion/contraction of the metal forming the threads 5 of the tubular member/pipe 2.

The (thread) protectors 3 and/or (thread) protector assemblies of the present invention are characterized by bumpers 8 (bumper portions) which are preferably generally radially outer sleeves or skirts which are softer than the (thread) engaging portions 7 but which also, to the extent possible, resist brittleness at low temperatures, as already mentioned.

In the context of the present invention, the terms "bumper" and "bumper portion" are preferably used as synonyms and can be interchanged.

The bumper portion 8 can preferably be made of and/or comprise a polymeric material.

To this end, certain polypropylenes, polyethylenes, polypropylene/polyethylene blends, ethylene-propylene copolymers, as well as any of such polymers in admixture with fillers/additives, which can in particular maintain/enhance tensile elongation of the polymers, and thereby decrease brittleness at low temperatures, e.g. 220.15 K, can be used as a material for the bumper portion 8.

Mostly preferred, the bumper portion 8 is at least partially made out of an elastomer, in particular a thermoplastic elastomer.

Referring first to FIG. 1, there is shown tubular member/pipe 2, e.g. surface casing, having a box/end 4. The box/end 4 is formed by internal tapered threads 5. The (thread) protector (assembly) shown generally as 3 preferably comprises an in particular engaging/tubular (body) portion 7 which is preferably externally threaded as shown, mostly preferred the threads 6 of tubular body 7 mating with the threads 5 of the box/end 4 or pipe 2.

In the context of the present invention, the terms "tubular portion", "tubular body portion", "tubular body" and "engaging portion" are preferably used as synonyms and can be interchanged.

In particular, engaging/tubular (body) portion 7 terminates at one end in an annular, radially outwardly extending flange 9 which, as can be seen, preferably overlies the nose/end or front side 10 of the box/end 4 or pipe 2.

Preferably, there is a disc, plate or bottom 11 which is preferably welded to the inner surface of tubular body 7. Plate 11 and the inner wall 12 of tubular body 7 can cooperate to form a socket 13, preferably having diametrically opposed notches 14, only one of which is shown, which can be engaged by a suitable tool to rotate engaging/tubular (body) portion 7 and thread it into or out of box/end 4 or pipe 2.

Further, the protector 3, in particular the bumper (portion) 8, preferably comprises or forms an annular sleeve shown generally as 15 and/or a tubular portion 15 which overlies the outside diameter of tubular member/pipe 2 on which the box/end 4 is formed.

As seen, there is in particular an annular gap between tubular portion or annular sleeve 15 and the OD (outer diameter) of tubular member/pipe 2 to allow for a loose fit between tubular portion or annular sleeve 15 and tubular member/pipe 2.

Mostly preferred, tubular portion 15 terminates on one end in an annular, radially inwardly extending flange 16 which overlies box end 4 or front side 10 of the pipe 2 and is received in a preferably annular recess 17 formed by box end 4 or front side 10 of the pipe 2 and flange 9.

Since tubular portion 15 can in particular comprise the bumper (portion) 8 of (thread) protector (assembly) 3 or vice versa, it has preferably the composition and properties described above with respect to the bumper (portion) 8. Thus, the sleeve or tubular portion 15 has preferably a shore hardness that is less than the shore hardness of the (thread) engaging portion 7 formed by tubular body 7.

Turning now to FIG. 2, there is shown an embodiment of the (thread) protector (assembly) 3 of the present invention very similar to that shown in FIG. 1. Specifically, plate/bottom 11 is in particular integrally formed or molded with engaging/tubular portion 7 as opposed to being welded thereto as shown in the embodiment of FIG. 1. In all other aspects, the embodiment of FIG. 2 is essentially the same as that shown in FIG. 1.

Figure 3:
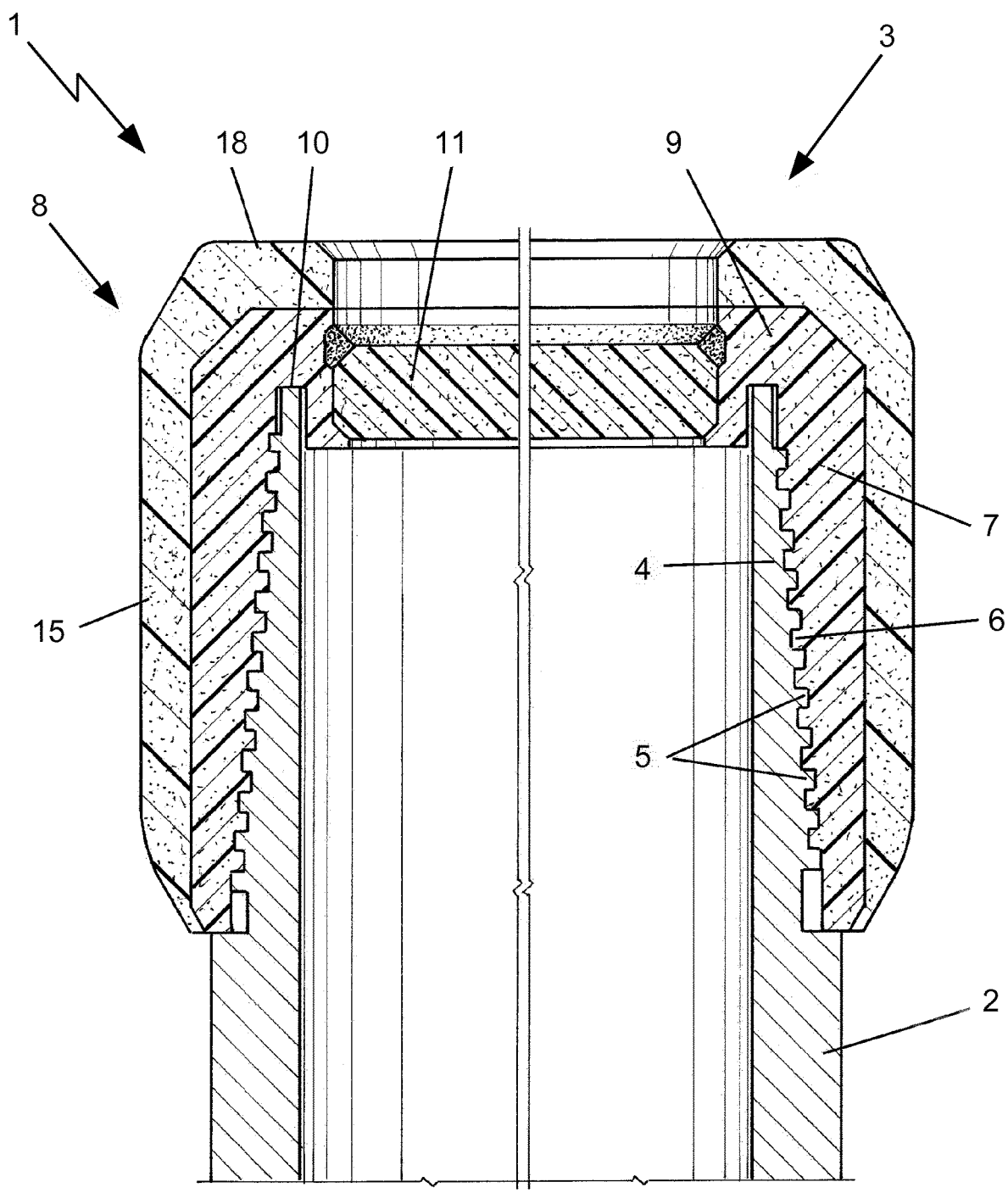
FIG. 3 is a schematic section of the system according to another embodiment.

Turning now to FIG. 3, there is shown a (thread) protector (assembly) 3 for use on a pin and/or a pipe 2 having an external thread 5.

The tubular member/pipe 2 is preferably externally threaded to form a pin. Affixed to pin is the (thread) protector (assembly) 3. Thus, the protector 3 according to FIG. 3 is preferably a pin protector.

Mostly preferred, (thread) protector (assembly) 3 comprises an engaging/tubular portion 7 which is in particular internally threaded, preferably with threads 6 to complement threads 5 of pin/pipe 2. While pin/pipe 2 is shown as having tapered threads 5, it will be appreciated that the threads 5 could be straight.

Engaging/tubular portion 7 in particular terminates on one end with an annular, radially inwardly extending flange 9, in particular wherein flange 9 overlies pin nose and/or the front side 10 of pin/pipe 2.

As already mentioned, the protector 3 can comprise a disc, plate or bottom 11.

Welded to the flange 9 can be the circular disc, plate or bottom 11, preferably wherein the disc 11 and the inner wall of flange 9 cooperate to form a socket which is in particular provided with slots (not shown) for engagement by a tool to thread or unthread the (thread) protector (assembly) 3 from the pin/pipe 2.

Tubular portion 7 is the (thread) engaging portion 7 and accordingly has the composition and properties described above with respect to (thread) engaging portions 7 of (thread) protector (assemblies) 3 of the present invention.

Further, disc 11 can be of the same or different composition as engaging/tubular portion 7, but in any event is preferably primarily a polymeric material.

As already mentioned, the protector 3, in particular the bumper portion 8, preferably comprises or forms a cap, in particular generally shown as 8.

The bumper/cap 8 can include an annular skirt or tubular portion 15 which in particular overlies the OD of engaging/tubular portion 7.

Further, the bumper/cap 8 can also include a—preferably annular, radially inwardly extending—flange portion 18 which preferably overlies flange 9.

Cap 8 can form the bumper portion 8 and accordingly can have the same composition and properties as described above with respect to bumper portion 8 of the (thread) protector (assemblies) 3 of the present invention.

In any event, the cap 8 and particularly skirt or tubular portion 15 will have in particular the same characteristics as described above with respect to the bumper portion 8.

Figure 4:
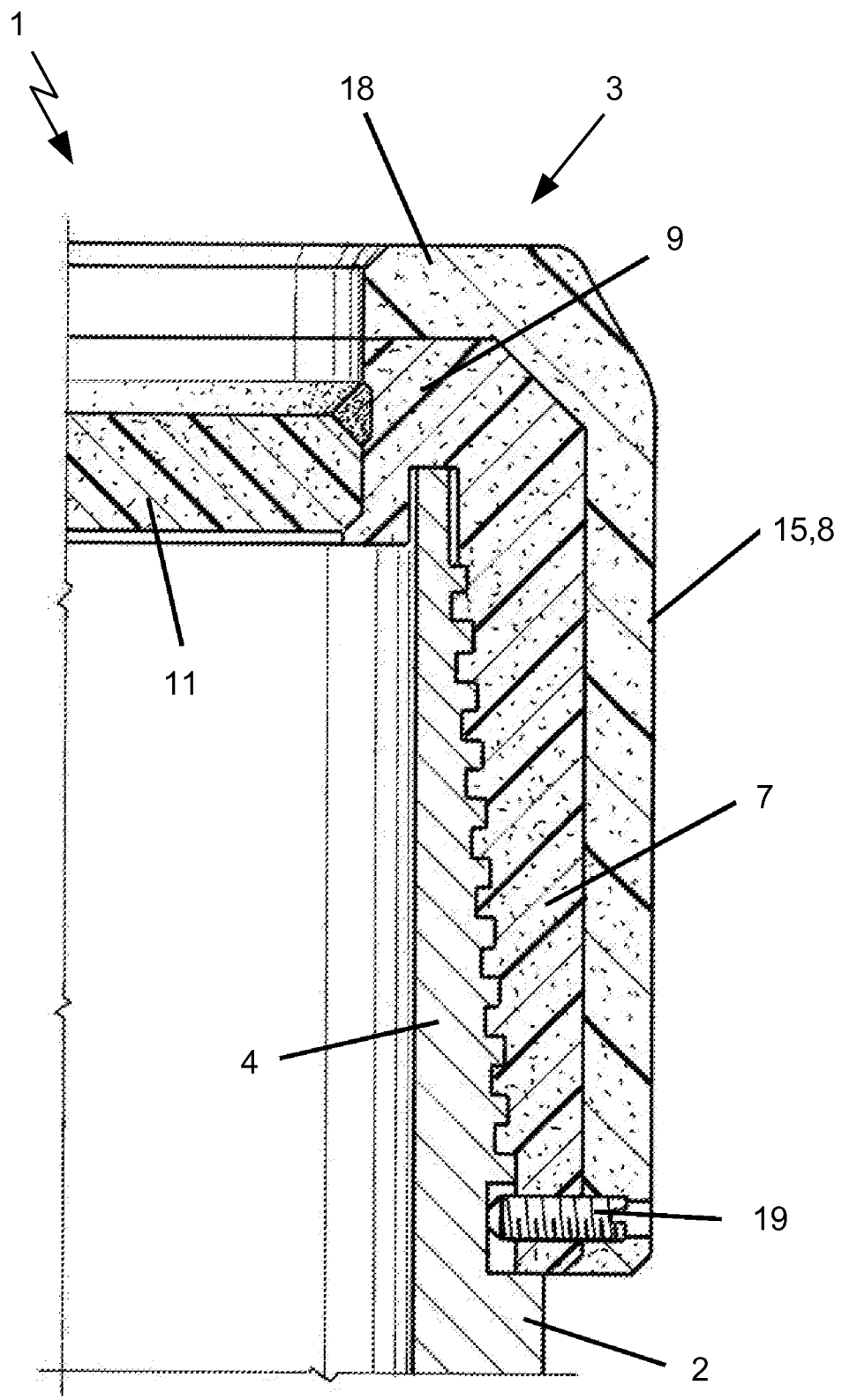
FIG. 4 is a schematic section of the system according to FIG. 3, but having a modified protector.

Referring now to FIG. 4, there is shown a modification of the (thread) protector (assembly) 3 shown in FIG. 3. Specifically, the embodiment shown in FIG. 4 differs from the embodiment to FIG. 3 in particular only in that there is a set screw 19 which preferably extends through skirt or tubular portion 15 of bumper/cap 8, and/or through tubular portion 7 to engage an annular relief in pin/pipe 2, in particular to ensure that the (thread) protector 3 does not back off or that the bumper/cap 8 does not separate from the rest of the (thread) protector (assembly) 3. In all other respects, the embodiment in FIG. 4 is essentially the same as the embodiment shown in FIG. 3.

Figure 5:
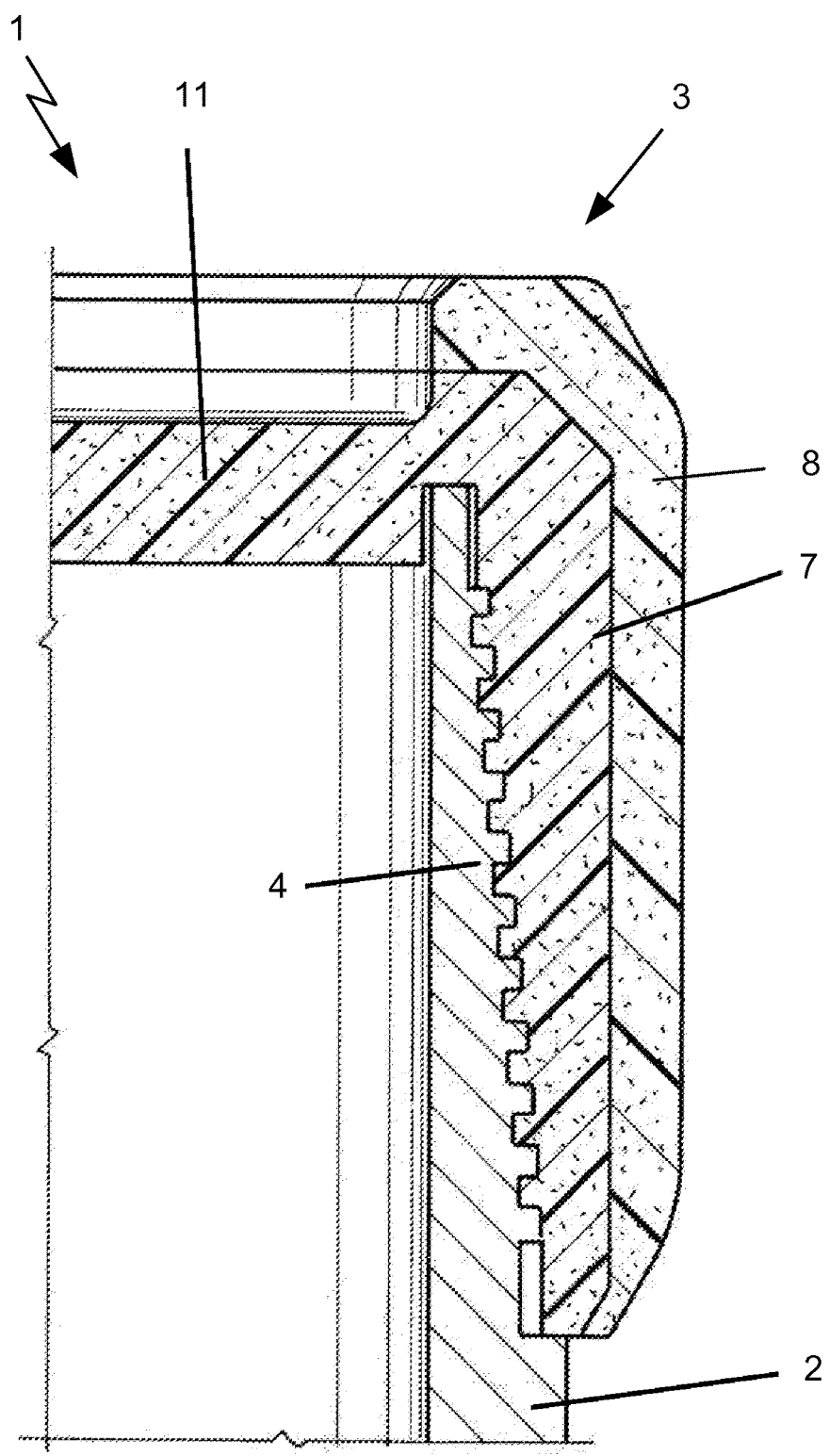
FIG. 5 is a schematic section of the system according to FIG. 3, but having a modified protector.

Turning to FIG. 5, there is shown another modification of the (thread) protector (assembly) 3 shown in FIG. 3. Specifically, the embodiment shown in FIG. 5 differs in particular form that shown in FIG. 3 only in respect of the disc, plate or bottom 11 being preferably integrally or monolithically formed with engaging/tubular portion 7. In all other respects, the embodiment in FIG. 5 is in particular the same as the embodiment shown in FIG. 3.

As can be seen from the above, the (thread) protector (assemblies) 3 of the present invention preferably provide several advantageous functions. For one, the (thread) engaging portions 7 can match the COE of the metal portions/threads 5 of the tubular member/pipe 2, while the bumper portion 8 can ensure that when the tubular member/pipe 2 is being handled as described above with respect to unloading a tubular member/pipe 2 from a barge onto an offshore platform, if the tubular member/pipe 2 engages a structural portion of the platform, the bumper portion 8 can minimize any possible damage to the ends of the tubular member/pipe 2, be it a pin or a box. The bumpers 8 are in particular also effective when the tubular members/pipe 2 are being shipped and maybe rolling around, in that they can absorb shock.

Although specific embodiments of the invention have been described herein in some detail, this has been solely for the purposes of explaining the various aspects of the invention, and is not intended to limit the scope of the invention as defined in the claims which follow.

Those skilled in the art will understand that the embodiment shown and described is exemplary, and various other substitutions, alterations and modifications, including but not limited to those design alternatives specifically discussed herein, may be made in the practice of the invention without departing from its scope.

Proposed is:

A thread protector for a tubular member having one of a threaded ID (inner diameter) or a threaded OD (outer diameter), comprising a tubular body portion having one of external threads or internal threads, wherein when said tubular body portion has external threads, there is an annular, radially outwardly extending flange on one end of said tubular body portion, wherein when said tubular body portion has external threads and is received in an internally threaded box having a box wall, said box wall having an outer surface, there is a first annular sleeve overlying said outer surface of said box wall, and wherein when said tubular body portion has internal threads, there is an annular, radially inwardly extending flange on one end of said tubular body portion, and there is a second annular sleeve in surrounding relationship to said tubular body portion.

The thread protector assembly for tubular members, particularly metallic oilfield tubulars, preferably has a thread engaging portion comprised of a polymeric composition which has a coefficient of thermal expansion which substantially matches that of the threads engaged by the thread protector assembly.

The thread protector assembly preferably also includes a bumper which is of a material which is softer than the material of the thread engaging portion and which minimizes and/or prevents damage to the ends of the tubular members, as for example when they are being lifted from a barge onto the platform of an offshore rig.

In the following further embodiments of the system 1/protector 3 will be described with reference to FIGS. 6 to 17.

The system 1/protector 3 described in the following preferably comprises at least one, several or all features described with reference to FIGS. 1 to 5.

Figure 6:
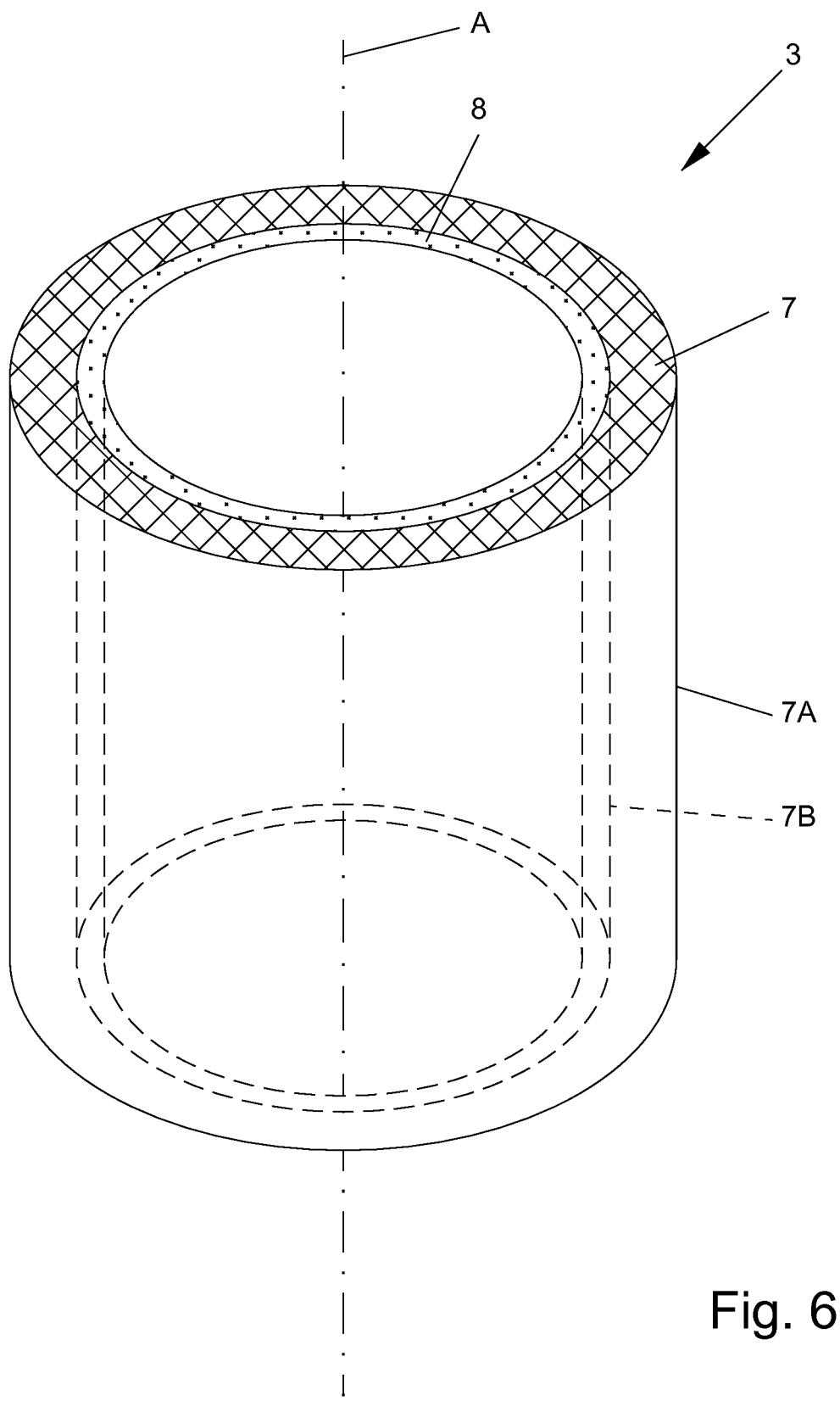
FIG. 6 is a schematic perspective view of the proposed protector embodied as a pin protector.
Figure 7:
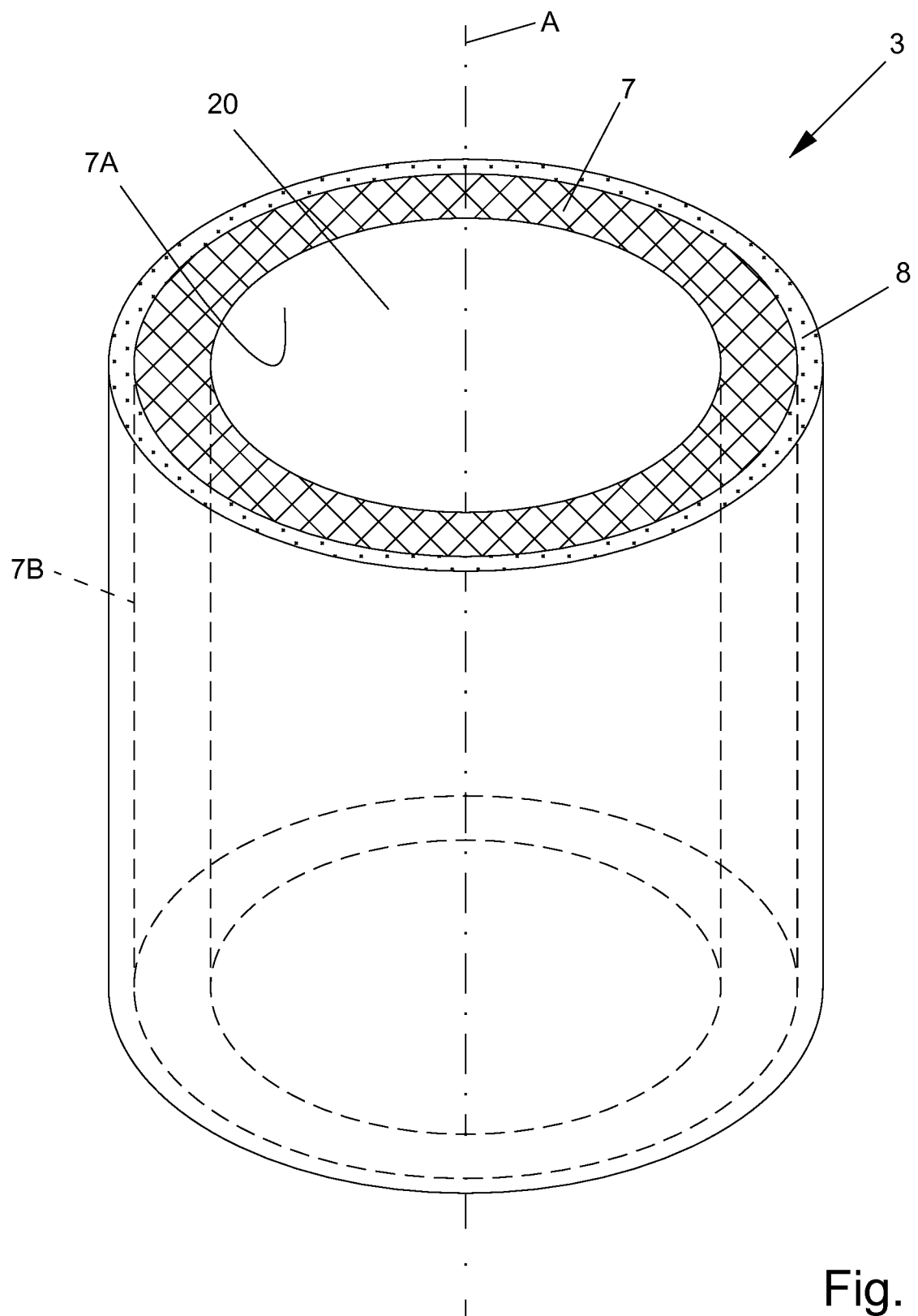
FIG. 7 is a schematic perspective view of the proposed protector embodied as a box protector.

FIGS. 6 and 7 show a schematic perspective view of a protector 3 for protecting an end 4 of a pipe 2.

The protector 3 shown in FIG. 6 is embodied as a box protector and/or adapted to protect the inner side of the pipe 2 or its end 4. In particular, the shown protector 3 is at least partially insertable into the pipe 2 or its end 4.

The protector 3 shown in FIG. 7 is embodied as a pin protector and/or adapted to protect the outer side of the pipe 2 or its end 4. In particular, the pipe 2 or its end 4 is at least partially insertable into the shown protector 3.

As already mentioned, the protector 3 preferably is at least essentially cylindrical and/or rotationally symmetric. Mostly preferred, the protector 3 is embodied as a hollow cylinder.

Preferably, the protector 3 comprises or defines an axis A, preferably wherein the axis A is a central, longitudinal or rotation axis of the preferably longitudinal and/or rotationally symmetric protector 3.

In the embodiment shown in FIGS. 6 and 7, the protector 3 is axially open, in particular at both axial ends. However, other constructional solutions are possible as well, in particular wherein the protector 3 comprises a bottom 11 and/or is axially closed at least at one end, as will be explained with reference to FIGS. 10 and 11.

The protector 3 preferably is of multi-piece construction and/or comprises an inner portion/layer and an outer portion/layer (with regard to the axis A).

Preferably, the protector 3 comprises an engaging portion/layer 7 and a bumper portion/layer 8.

The engaging portion 7 and the bumper portion 8 are preferably connected to one another in a force-fitting and/or form-fitting manner and/or by screwing, welding and/or glueing.

The engaging portion 7 is preferably adapted to (directly) corporate/interact with the pipe 2 or its end 4 (not shown in FIGS. 6 to 9).

The engaging portion 7 preferably comprises a mounting/engaging surface 7A for the pipe 2 and/or a contact/connection surface 7B for the bumper portion 8, preferably wherein the mounting surface 7A and the contact surface 7B each is a shell surface of the preferably cylindrical engaging portion 7.

Preferably, the mounting surface 7A and the contact surface 7B are facing away from one another and/or form opposite sides of the engaging portion 7.

The mounting surface 7A preferably faces the pipe 2 and the contact surface 7B preferably faces the bumper portion 8.

In case the protector 3 is an embodied as a box protector and/or adapted to be inserted into the pipe 2, the mounting surface 7A forms an outer (shell) surface and/or faces away from the axis A and the contact surface 7B forms an inner (shell) surface of the engaging portion 7 and/or faces the axis A (as shown in FIG. 6).

In case the protector 3 is embodied as a pin protector and/or adapted to be plugged on and/or cover the pipe 2, in particular its end 4, the mounting surface 7A preferably forms an inner (shell) surface and/or faces the axis A and the contact surface 7B preferably forms an outer (shell) surface of the engaging portion 7 and/or faces away from the axis A (as shown in FIG. 7).

The engaging portion 7, in particular its mounting surface 7A, preferably has a shore D hardness of at least 40 or 50 and/or of at most 100 or 80.

The bumper portion 8 preferably has a shore D hardness of at least 20 or 30 and/or of at most 70 or 50.

The bumper portion 8 is preferably adapted to protect the engaging portion 7, in particular on a side facing away from the pipe 2, and/or serves as an absorber/buffer.

Mostly preferred, the bumper portion 8 is embodied as a layer/cover/coat/cap for the engaging portion 7, in particular on the side facing away from the pipe 2.

Preferably, the bumper portion 8 is directly and/or radially connected/attached to the engaging portion 7, in particular its contact surface 7B.

With other words, the engaging portion 7 is preferably arranged between the bumper portion 8 and the pipe 2, when being attached to the latter.

The bumper portion 8 is preferably embodied as a hollow cylinder and/or covers the engaging portion 7 radially.

In case the protector 3 is embodied as a box protector and/or adapted to be inserted into the pipe 2, in particular its axial end 4, the bumper portion 8 is preferably arranged within the engaging portion 7, i.e. the engaging portion 7 radially surrounds the bumper portion 8 (as shown in FIG. 6).

With other words, the bumper portion 8 preferably forms a core of the protector 3.

In case the protector 3 is embodied as a pin protector and/or adapted to be plugged on the pipe 2, the engaging portion 7 is preferably arranged within the bumper portion 8 and/or the bumper portion 8 preferably surrounds the engaging portion 7 radially (as shown in FIG. 7).

With other words, the bumper portion 8 preferably forms a mantle of the protector 3.

The protector 3, in particular the engaging portion 7 or the bumper portion 8, preferably comprises an inner or outer diameter of more than 25 cm or 40 cm, in particular more than 50 cm or 60 cm, and/or less than 500 cm or 250 cm, in particular less than 153 cm.

Preferably, the engaging portion 7 is thicker than the bumper portion 8, in particular by a factor of at least 1.20 or 2 and/or at most 10 or 8.

Preferably, the engaging portion 7 and/or the bumper portion 8 comprise/comprises a thickness of more than 0.5 mm or 1 mm, in particular more than 2 mm or 5 mm, and/or less than 100 mm or 80 mm, in particular less than 50 mm or 20 mm.

The engaging portion 7 and the bumper portion 8 are preferably connected to one another in a force-fitting manner and/or by bonding/glueing. Mostly preferred, the engaging portion 7 and the bumper portion 8 are preferably (solely) frictionally connected/engaged to one another and/or without using (additional) adhesives. However, it is also possible to connect the engaging portion 7 and the bumper portion 8 by screwing, in particular wherein the engaging portion 7 and the bumper portion 8 are accordingly threaded.

As already mentioned, the protector 3, in particular the bumper portion 8, preferably comprises a flange portion 18, preferably wherein the flange portion 18 comprises or forms an axial end of the protector 3.

Figure 8:
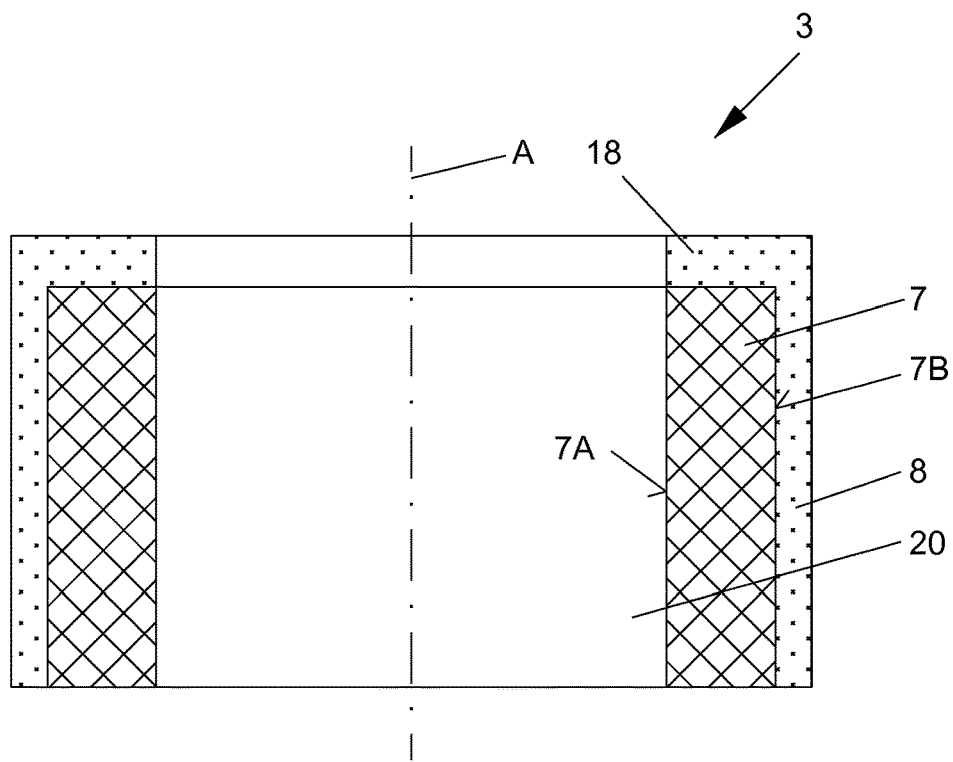
FIG. 8 is a schematic section of the proposed (pin) protector according to another embodiment.
Figure 9:
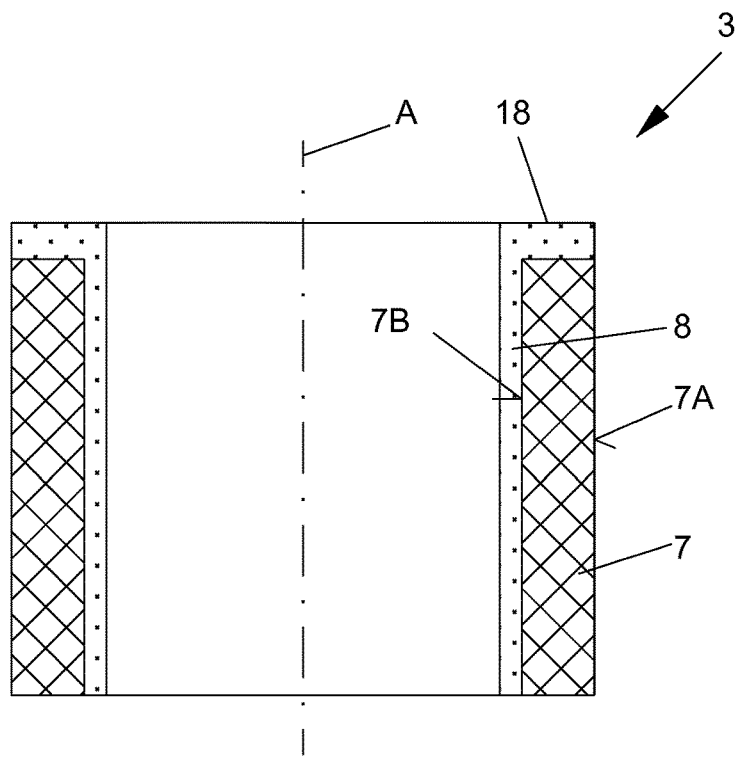
FIG. 9 is a schematic section of the proposed (box) protector according to another embodiment.

FIGS. 8 and 9 show embodiments of the protector 3 that comprise such a flange portion 18.

Preferably, the flange portion 18 covers the engaging portion 7 axially and/or such that the engaging portion 7 is covered entirely and/or to the outside (in case of a pin protector 3) or to the inside (in case of a box protector 3) by means of the bumper portion 8 and the flange portion 18.

In the embodiments shown in FIGS. 8 and 9, the bumper portion 8 preferably comprises or forms the flange portion 18. With other words, the bumper portion 8 and the flange portion 18 are preferably formed integrally. However, other constructional solutions are possible as well, in particular wherein the flange portion 18 is formed by a separate part.

The bumper portion 8 preferably serves as a radial bumper/buffer and the flange portion 18 preferably serves as an axial bumper/buffer.

FIG. 8 shows a pin protector 3 and/or a protector 3 that is adapted to be plugged/pushed on the pipe 2, in particular its axial end 4, mostly preferred such that the protector 3 covers the end 4 of the pipe 2.

Thus, when being attached to the pipe 2, the bumper portion 8 and the optional flange portion 18 preferably cover the engaging portion 7 entirely and/or both radially and axially, in particular such that the engaging portion 7 is not visible to the outside.

In this way, the engaging portion 7 is held together by means of the bumper portion 8 and/or the flange portion 18 both axially and radially. In particular, the risk of tension cracks and flake off is reduced.

The flange portion 18 is preferably embodied as a ring and/or axially attached to the engaging portion 7 and/or the bumper portion 8. However, it is also possible that the flange portion 18 is plate-like and/or comprises or forms a bottom 11 of the protector 3.

In the embodiments shown in FIGS. 8 and 9, the flange portion 18 comprises a radial extension that matches the radial extension of the engaging portion 7 and the bumper portion 8. However, it is also possible that the radial extension of the flange portion 18 differs from the radial extension of the engaging portion 7 and/or bumper portion 8.

The flange portion 18 might project to the inside and/or towards the axis A and/or to the outside and/or away from the axis A, in particular to form a preferably circumferential bulge.

Additionally or alternatively to the flange portion 18, the protector 3 might be equipped with a flange 9, preferably wherein the flange 9 is formed by the engaging portion 7, in particular a (radial) bulge thereof. Mostly preferred, the flange 9 and the engaging portion 7 might be formed integrally, as already shown in FIGS. 1 to 5.

Figure 10:
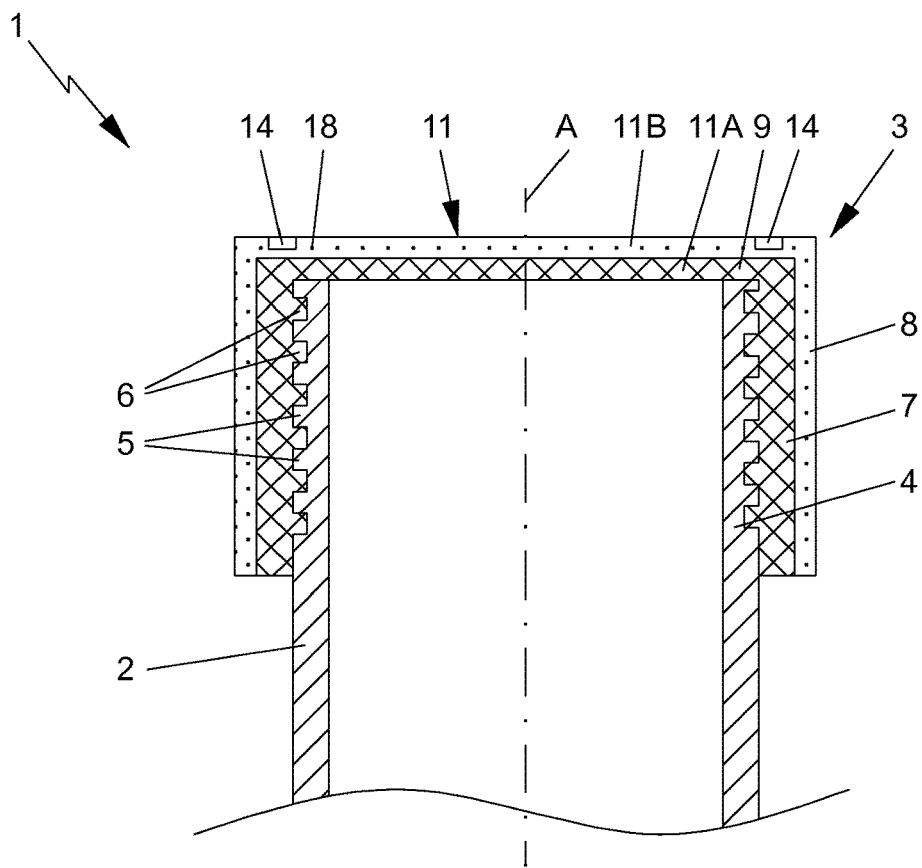
FIG. 10 is a schematic section of the system having a proposed (pin) protector according to another embodiment and a threaded pipe.
Figure 11:
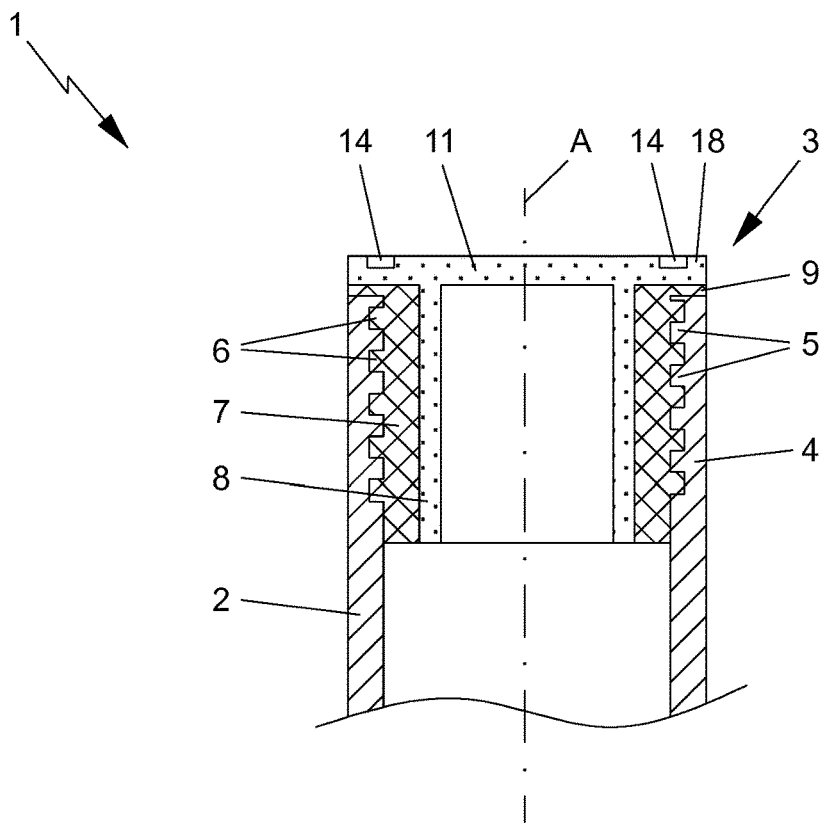
FIG. 11 is a schematic section of the system having a proposed (box) protector according to another embodiment and a threaded pipe.

FIGS. 10 and 11 show further embodiments of the system 1 comprising a protector 3 that is preferably axially closed.

FIG. 10 shows the system 1 having a pin protector 3 and FIG. 11 shows the system 1 having a box protector 3.

As already mentioned with reference to FIGS. 1 to 5, the protector 3 might be equipped with a bottom 11, preferably wherein the bottom 11 comprises or forms an axial end of the protector 3 and/or (axially) closes the preferably cylindrical protector 3 axially.

The protector 3 preferably comprises or forms a receptacle 20 for axially receiving the pipe 2, in particular its end 4. Mostly preferred, the receptacle 20 is radially limited by the engaging portion 7 and/or axially limited by the bottom 11, the flange 9 and/or the flange portion 18.

The bottom 11 is preferably axially attached to the engaging portion 7, the bumper portion 8, the flange 9 and/or the flange portion 18.

Preferably, the bottom 11 is formed by and/or integrally with the engaging portion 7, the bumper portion 8, flange 9 and/or flange portion 18.

Mostly preferred, the bumper portion 8, flange 9, bottom 11 and/or flange portion 18 are made out of the same material, in particular an elastomer.

The flange 9, flange portion 18 and/or bottom 11 preferably comprise/comprises a thickness of more than 0.5 mm or 1 mm, in particular more than 2 mm or 5 mm, and/or less than 100 mm or 50 mm.

The protector 3, in particular the bottom 11, preferably comprises a first bottom portion 11A and/or a second bottom portion 11B.

The first bottom portion 11A is preferably formed integrally with the engaging portion 7 and the second bottom portion 11B is preferably formed integrally with the bumper portion 8.

With other words, the engaging portion 7 preferably comprises or forms the first bottom portion 11A and/or the bumper portion 8 preferably comprises or forms the second bottom portion 11B.

Thus, the bottom 11 is preferably of multi-piece construction and/or comprises multiple layers/portions.

However, other constructional solutions are possible as well, in particular wherein solely the engaging portion 7 or the bumper portion 8 comprises or forms the bottom 11, as shown in FIG. 11, in which the bottom 11 is integrally formed by the bumper portion 8.

The protector 3, in particular the bottom 11, might be equipped with at least one notch 14, that is adapted to receive a tool and/or which can be used to rotate the protector 3 for the assembly/disassembly.

As already mentioned, the pipe 2, in particular its end 4, might be externally or internally threaded and/or equipped with an internal or external thread 5. In FIG. 10 the pipe 2 comprises an external thread 5 and in FIG. 11 the pipe 2 comprises an internal thread 5.

The protector 3, preferably the engaging portion 7, in particular its mounting surface 7A, might be correspondingly internally or externally threaded and/or equipped with an external or internal thread 6.

In FIG. 10, the protector 3, in particular the engaging portion 7, comprises an internal thread 6 that matches and/or corresponds to the external thread 5 of the pipe 2.

In FIG. 11, the protector 3, in particular the engaging portion 7, comprises an external thread 6 that matches and/or corresponds to the internal thread 5 of the pipe 2.

Thus, the protector 3 is preferably connected to the pipe 2, in particular its end 4, by screwing, in particular in case the pipe 2 is threaded. However, it is also possible, that—although the pipe 2 is threaded—the protector 3, in particular its mounting surface 7A, is threadless or "plain".

Figure 12:
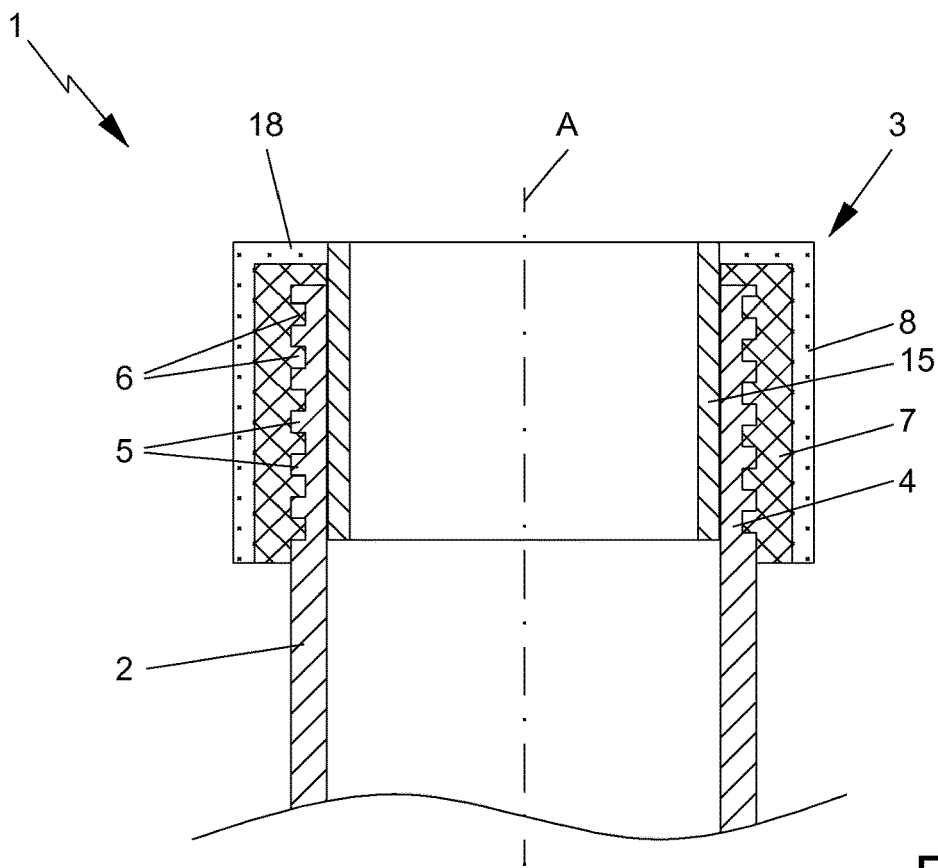
FIG. 12 is a schematic section of the system having a proposed (pin) protector according to another embodiment and a threaded pipe.
Figure 13:
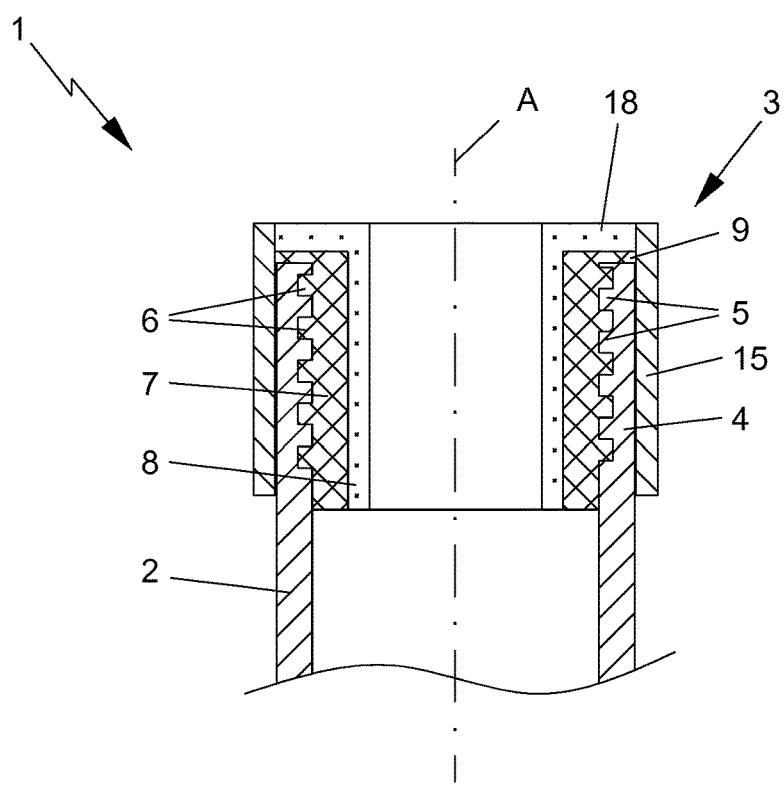
FIG. 13 is a schematic section of the system having a proposed (box) protector according to another embodiment and a threaded pipe.

FIGS. 12 and 13 show further preferred embodiments of the protector 3 comprising an optional tubular portion 15, as already explained with reference to FIGS. 1 and 2.

The tubular portion 15 is preferably embodied as an annular sleeve and/or a hollow cylinder that is arranged within the engaging portion 7 (FIG. 12) or around the engaging portion 7 (FIG. 13). Mostly preferred, the tubular portion 15 is or forms an exterior or interior of the protector 3.

Preferably the tubular portion 15 limits the receptacle 20 radially and/or on a side opposite to the engaging portion 7.

With other words, the tubular portion 15 serves as a counter part of the engaging portion 7 and/or (directly/radially) engages and/or rests on the pipe 2, in particular its end 4.

Thus, the pipe 2, in particular its end 4, can be inserted into the (ring-like) space/receptacle 20 between and/or radially limited by the tubular portion 15 and the engaging portion 7.

In this way, the pipe 2, in particular its end 4, is protected on the inside and on the outside.

The tubular portion 15 is preferably connected to the engaging portion 7, bumper portion 8, flange 9, flange portion 18 and/or bottom 11, in particular in a form-fitting and/or force-fitting manner and/or by welding.

Preferably, the tubular portion 15 is (axially) clamped between the engaging portion 7, in particular the flange 9 thereof, and the front side of the pipe 2, when attaching the protector 3 to the pipe 2, as will be described later with reference to FIG. 17.

According to another preferred embodiment (not shown), the tubular portion 15 is formed integrally with the engaging portion 7 and/or bumper portion 8.

As already mentioned, the system 1 preferably comprises at least one pipe 2 and at least one protector 3. Mostly preferred, the system 1 comprises two protectors 3, wherein one protector 3 is associated and/or attached to a corresponding end 4 of the pipe 2.

Preferably, the system 1 comprises a plurality of pipes 2, in particular wherein two protectors 3 are associated and/or attached to one pipe 2.

Figure 14:
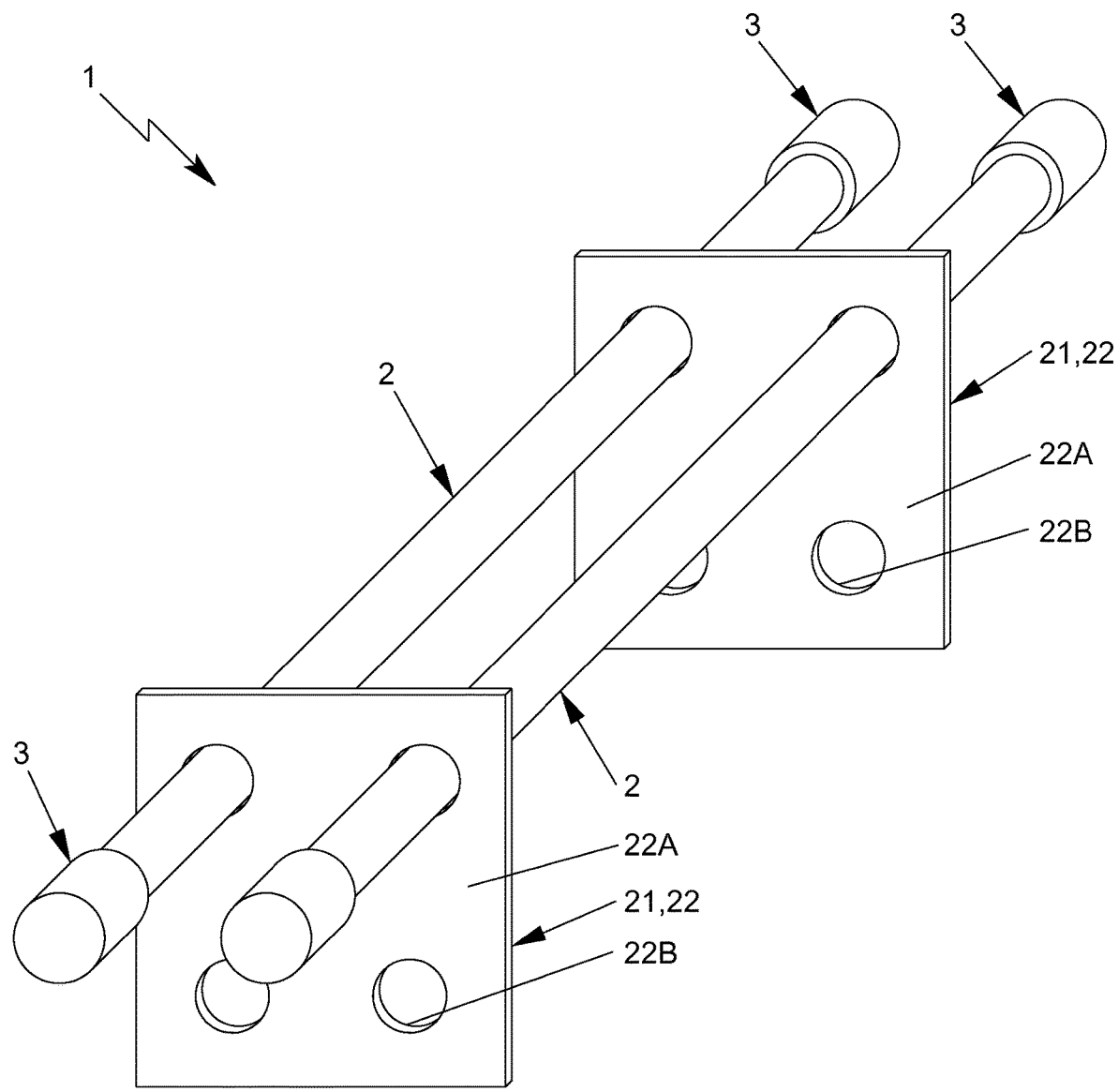
FIG. 14 is a schematic perspective view of another embodiment of the system having a plurality of pipes and a support for bearing the plurality of pipes.

FIG. 14 shows a preferred embodiment of the system 1 comprising a plurality of pipes 2 and a plurality of protectors 3.

In particular in order to space the pipes 2 apart from one another and/or to hold the pipes 2 spaced apart from one another, the system 1 comprises at least one support 21.

In the embodiment shown in FIG. 14, the support 21 is embodied as a frame 22, preferably wherein the frame 22 is adapted to bear the pipes 2 spaced apart from one another.

The frame 22 preferably comprises a main body 22A and at least one receptacle 22B for receiving the pipes 2.

The frame 22, in particular its main body 22A, is preferably made out of metal.

Preferably, the pipe 2 is inserted or insertable into the frame 22, mostly preferred its receptacle 22B.

In the embodiment shown in FIG. 14, the receptacles 22B are preferably embodied as holes. However, other constructional solutions are possible as well, in particular wherein the receptacles 22B are embodied as slots, mostly preferred such that the pipes 2 can be inserted into the frame 22 laterally.

The system 1 preferably comprises a plurality of supports 21, in particular frames 22, preferably wherein one support 21 is arranged at a first end 4 of the pipes 2 and another support 21 is arranged at the other end 4 of the pipe 2. In this way, the weight of the pipes 2 is evenly distributed over the supports 21.

Figure 15:
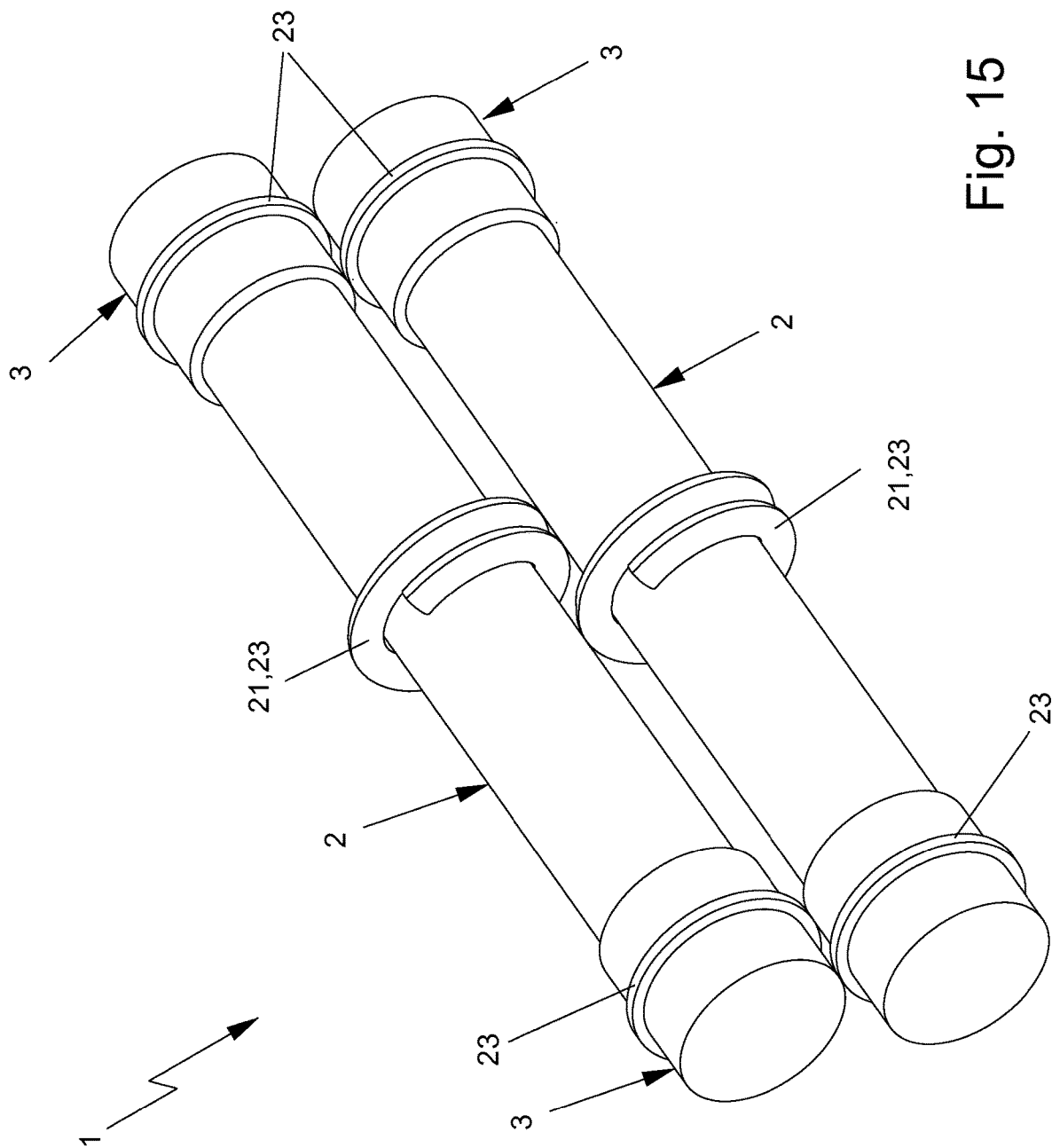
FIG. 15 is a schematic perspective view of another embodiment of the proposed system.

FIG. 15 shows another embodiment of the system 1, wherein the support 21 is embodied as a preferably helical ring/spacer 23 attached to the pipe(s) 2. The ring/spacer 23 preferably ensures that the pipes 2 do not come into direct contact with one another.

Alternatively or additionally, the protector 3 might comprise or form the spacer 23, as indicated in FIG. 15.

In particular, the protector 3, mostly preferred the bumper portion 8 or flange portion 18, comprises or forms a preferably circumferential bead/bulge that serves as spacer 23. In this way corresponding advantages can be achieved.

Figure 16:
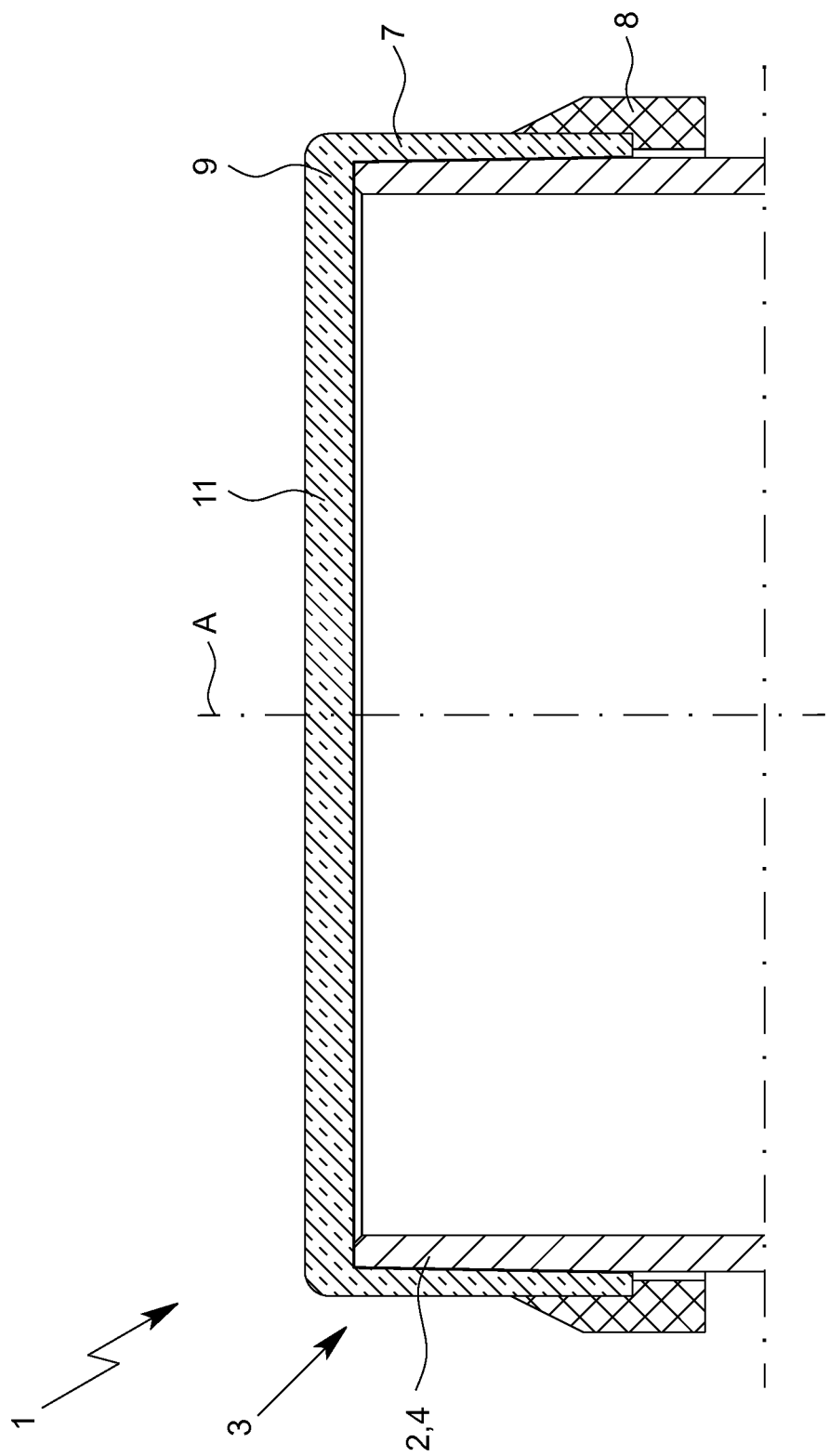
FIG. 16 is a schematic section of the system having a proposed (pin) protector according to another embodiment and a pipe.

FIG. 16 shows another embodiment of the protector 3, which is similar to the embodiments shown in FIG. 3 and FIG. 10.

Here, the engaging portion 7 is preferably embodied as a cap or comprises or forms the bottom 11.

Preferably, the bumper portion 8 is embodied as a (mounting) ring and/or is arranged on the engaging portion 7, preferably in a ring-like manner.

In contrast to the previous embodiments, the bumper portion 8 preferably does not cover the engaging portion 7 completely/entirely, but rather partially.

Preferably, the axial extension of the bumper portion 8 is shorter than the axial extension of the engaging portion 7. Mostly preferred, the length of the engaging portion 7 is at least twice the length of the bumper portion 8.

Preferably, the bumper portion 8 forms a ring-like bulge on the outer surface of the engaging portion 7. Mostly preferred, the bumper portion 8 comprises or forms the ring/spacer 23, as already mentioned with reference to FIG. 15.

The bumper portion 8 is preferably arranged on and/or covers the axial/open end of the engaging portion 7 and/or the end opposite to the flange 9 or bottom 11 of the engaging portion 7. With other words, the bumper portion 8 preferably protects the top and/or the opening of the engaging portion 7, in particular radially and/or to the outside.

Preferably, the bumper portion 8 overlaps only partially the engaging portion 7. In particular, the bumper portion 8 protrudes from the engaging portion 7 axially and/or reaches under the axial end of the engaging portion 7.

In this way, material can be saved compared to embodiments wherein the bumper portion 8 covers the engaging portion 7 completely. Further, the assembly/disassembly of the protector 3 is facilitated since the bumper portion 8 serves/provides a mounting/assembly/hitting surface and/or can be used to knock off the protector 3 from the pipe 2.

Preferably, the engaging portion 7 is at least partially, mostly preferred completely, made out of an elastomer, in particular a thermoplastic elastomer (TPE).

Preferably, the engaging portion 7 is softer than the bumper portion 8 and/or has a shore D hardness that is lower than the shore D hardness of the bumper portion 8.

Mostly preferred, the bumper portion 8 is at least partially, in particular completely, made out of a polymeric material, preferably plastic material, in particular (pure) polypropylene and/or (pure) polyethylene.

Due to the bumper portion 8, it is possible to mount and/or remove the protector 3 on/from the pipe 2.

Figure 17:
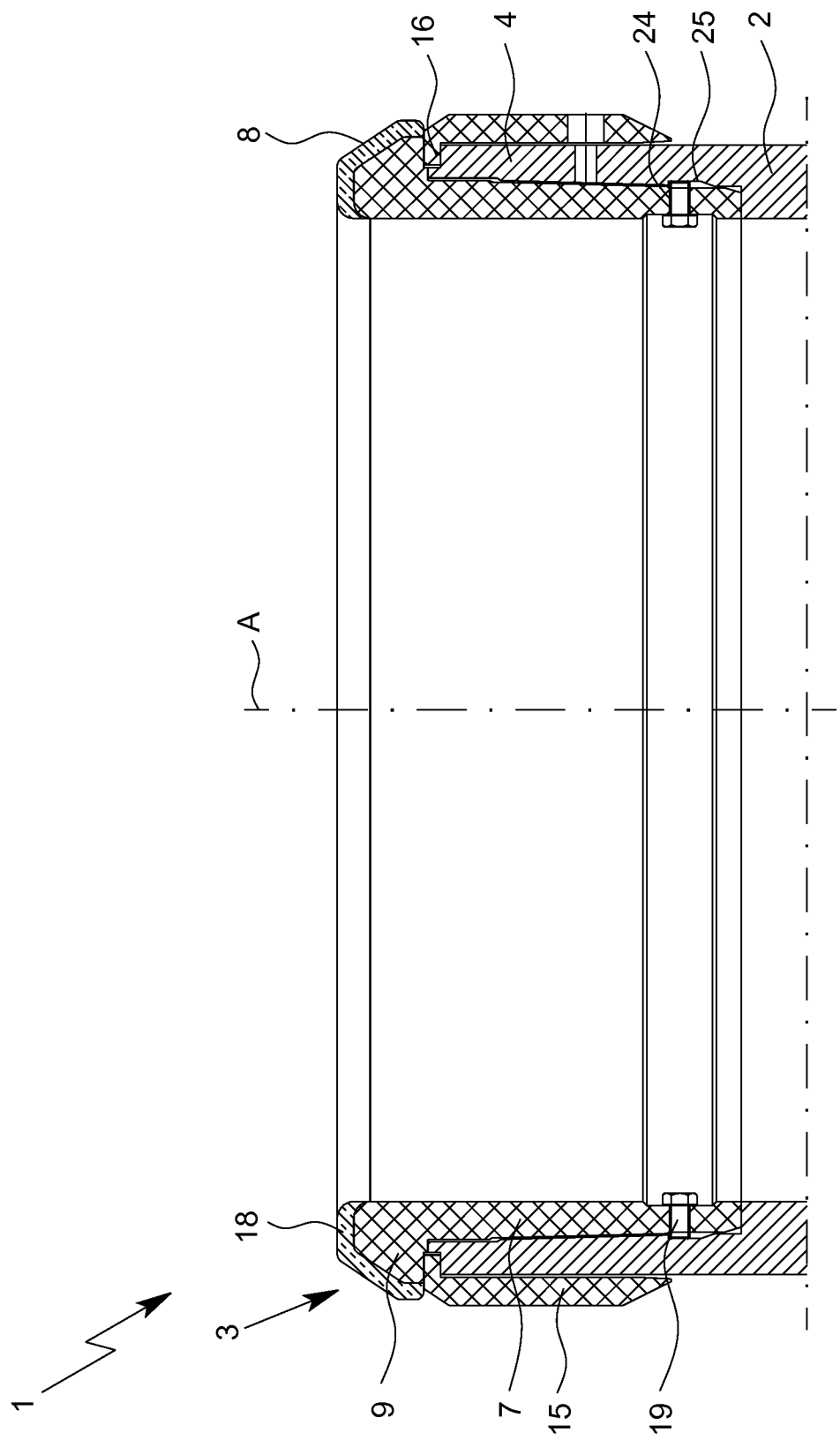
FIG. 17 is a schematic section of the system having a proposed (box) protector according to another embodiment.

FIG. 17 shows the system 1 comprising a protector 3 according to a further embodiment.

The protector 3 according to FIG. 17 is similar to the embodiments shown in FIG. 1 and FIG. 13.

In the embodiment shown in FIG. 17, the protector 3 is preferably embodied to protect both, the inner side and the outer side of the pipe 2, in particular its end 4.

The engaging portion 7 is preferably at least partially inserted into the pipe 2, in particular its end 4.

Preferably, the protector 3, in particular its engaging portion 7, comprises or forms the flange 9 which projects axially and/or radially out of the pipe 2, in particular its end 4.

The flange 9 preferably comprises an outer diameter which is larger than the outer diameter of the engaging portion 7 and/or the pipe 2.

Preferably, the engaging portion 7 and/or the flange 9 comprises or forms a stop when inserting the protector 3 into the pipe 2. Mostly preferred, the flange 9 rests on the pipe 2, in particular the axial end 4 of the pipe 2, and/or its front side, when the protector 3 is completely attached to the pipe 2, in particular its end 4.

In the present embodiment, the bumper portion 8 is preferably embodied as a ring and/or a ring-like cap attached to the flange 9 and/or covering the flange 9, mostly preferred to the outside.

Preferably, (only) the flange 9 is covered/protected by means of the bumper portion 8, preferably radially and/or axially.

Optionally, the protector 3 comprises the annular sleeve/tubular portion 15 protecting the pipe 2, in particular its end 4, to the outside.

As already shown in FIG. 1, the tubular portion 15 might be equipped with the (radial) flange/protrusion 16, preferably wherein the flange/protrusion 16 is (axially) clamped between the flange 9 of the engaging portion 7 and/or the bumper portion 8 on the one hand and the pipe 2, in particular its end 4, mostly preferred its front surface, on the other hand. In this way, the tubular portion 15 is held between the engaging portion 7 and/or the bumper portion 8 on the one hand and the pipe 2 on the other hand. However, it is also possible that the engaging portion 7 or the bumper portion 8 are formed integrally with the tubular portion 15.

In the embodiments shown in FIGS. 16 and 17, the pipe 2 is preferably embodied as a non-threaded pipe. Preferably, the protector 3 is pressed into and/or onto the pipe 2, in particular such that the protector 3 is kept in place by means of the frictional force acting between the protector 3, in particular its engaging portion 7, and the pipe 2.

However, it is also possible to additionally secure the protector 3 to the pipe 2.

In the embodiment shown in FIG. 17, the protector 3 is secured to the pipe 2, in particular its end 4.

To this end, the protector 3 preferably comprises at least one securing element, in particular the securing element/screw 19, that interacts with the (inner) surface of the pipe 2, in particular in a form-fitting manner.

Preferably, the protector 3, in particular its engaging portion 7, comprises a corresponding opening 24, preferably wherein the opening 24 extends from the inner side to the outer side of the protector 3, in particular its engaging portion 7.

The securing element/screw 19 is inserted into the opening 24, in particular such that it can engage the pipe 2, in particular radially.

The pipe 2, in particular its end 4, might be equipped with corresponding recesses 25 for the securing element/screw 19, in particular such that the protector 3 is secured to the pipe 2 in a form-fitting manner.

Individual features, aspects and/or principles of the embodiments described herein may be implemented independently from one another, but also in any desired combination.

LIST OF REFERENCE SIGNS 1 system
2 pipe/pin/box/tubular member
3 (thread) protector/protector assembly
4 end
5 thread (pipe)
6 thread (protector)
7 (thread) engaging/tubular portion
7A mounting surface
7B contact surface
8 bumper portion/bumper/cap
9 flange (associated with 7)
10 front side
11 bottom/disc/plate
11A first bottom portion
11B second bottom portion
12 inner wall
13 socket
14 notches
15 annular sleeve/tubular portion
16 flange (associated with 15)
17 recess
18 flange portion (associated with 8)
19 screw/securing element
20 receptacle
21 support
22 frame
22A main body
22B receptacle
23 ring/spacer
24 opening
25 recess
A axis

The invention claimed is:

1. A protector adapted to protect threads on pipes, the protector comprising an engaging portion and a bumper portion,
   wherein the engaging portion is internally threaded,
   wherein the bumper portion covers the engaging portion radially,
   wherein the engaging portion is made of a polymeric material,
   wherein the bumper portion is at least one of being softer than the engaging portion or having a shore D hardness that is lower than the shore D hardness of the engaging portion, and
   wherein the protector comprises a bottom axially closing the protector, the bottom being integrally formed with the engaging portion.

2. The protector according to claim 1, with at least one of the engaging portion having a shore D hardness of from about 60 to 70 or the bumper portion having a shore D hardness of less than 50.

3. The protector according to claim 1, wherein the engaging portion is formulated from at least one of polypropylene or polyethylene.

4. The protector according to claim 1, wherein the engaging portion is internally threaded.

5. The protector according to claim 4, wherein the protector comprises a cap, wherein the cap forms the bumper portion and includes an annular skirt which overlies the outer diameter of the engaging portion.

6. A protector configured to protect an end of a pipe, the protector comprising an engaging portion for cooperating with the pipe and a bumper portion for protecting the engaging portion,
   wherein the engaging portion and the bumper portion are connected to one another,
   wherein the engaging portion comprises an internal thread,
   wherein the bumper portion is at least partially made out of an elastomer,
   wherein the protector comprises a bottom axially closing the protector,
   wherein the bottom comprises a first bottom portion and a second bottom portion, the first bottom portion being formed integrally with the engaging portion and the second bottom portion being formed integrally with the bumper portion, and
   wherein the bumper portion covers the engaging portion radially and the second bottom portion covers the first bottom portion axially.

7. The protector according to claim 6, wherein the engaging portion is at least essentially made out of at least one of polypropylene or polyethylene.

8. The protector according to claim 6, wherein at least one of the protector, the engaging portion or the bumper portion is embodied as at least one of a hollow cylinder, a cap or a ring.

9. The protector according to claim 6, wherein the engaging portion comprises or forms a thread for a threaded pipe.

10. The protector according to claim 6, wherein the protector comprises at least one of a flange portion, wherein the flange portion comprises or forms at least one of a radial protrusion or a bulge of the protector.

11. The protector according to claim 10, with at least one of the flange portion being formed by the engaging portion or the bottom being formed by the bumper portion.

12. The protector according to claim 10, wherein the protector comprises a receptacle for receiving a pipe, wherein the receptacle is radially limited by the engaging portion and axially limited by the flange portion.

13. The protector according to claim 12, wherein the protector comprises a tubular portion, wherein the tubular portion is radially spaced apart from the engaging portion and wherein the receptacle is radially limited by the tubular portion and by the engaging portion.

14. The protector according to claim 10, wherein the bumper portion covers the engaging portion and the flange portion or wherein the outer diameter of the engaging portion is smaller than the inner diameter of the bumper portion.

15. The protector according to claim 6, with the bumper portion at least one of being arranged on the engaging portion in a ring-like manner or covering the engaging portion partially.

16. A protector configured to protect an end of a pipe, the protector comprising an engaging portion for cooperating with the pipe and a bumper portion for protecting the engaging portion,
   wherein the engaging portion and the bumper portion are connected to one another,
   wherein the bumper portion is at least partially made out of an elastomer,
   at least one of the bumper portion being arranged within the engaging portion or the outer diameter of the bumper portion being smaller than the inner diameter of the engaging portion.

17. The protector according to claim 16, wherein the engaging portion is at least essentially made out of at least one of polypropylene or polyethylene.

18. The protector according to claim 16, wherein the engaging portion comprises an external thread.

19. The protector according to claim 16, wherein the protector comprises a bottom axially closing the protector, the bottom being integrally formed with the bumper portion.

20. The protector according to claim 16, wherein the protector comprises a receptacle for receiving the pipe and a tubular portion radially spaced apart from the engaging portion, wherein the receptacle is radially limited by the engaging portion and the tubular portion.

* * * * *